(12) United States Patent
Whitehead et al.

(10) Patent No.: US 8,271,194 B2
(45) Date of Patent: Sep. 18, 2012

(54) METHOD AND SYSTEM USING GNSS PHASE MEASUREMENTS FOR RELATIVE POSITIONING

(75) Inventors: Michael L. Whitehead, Scottsdale, AZ (US); Steven R. Miller, Scottsdale, AZ (US); John A. McClure, Scottsdale, AZ (US); Cary Davis, Cave Creek, AZ (US); Walter J. Feller, Airdrie (CA)

(73) Assignee: Hemisphere GPS LLC, Calgary, Alberta (CA)

( * ) Notice: Subject to any disclaimer, the term of this patent is extended or adjusted under 35 U.S.C. 154(b) by 283 days.

(21) Appl. No.: 12/554,741

(22) Filed: Sep. 4, 2009

(65) Prior Publication Data

US 2009/0322600 A1 Dec. 31, 2009

Related U.S. Application Data

(63) Continuation-in-part of application No. 12/355,776, filed on Jan. 17, 2009, which is a continuation-in-part of application No. 12/171,399, filed on Jul. 11, 2008, which is a continuation-in-part of application No. 10/804,758, filed on Mar. 19, 2004, now Pat. No. 7,400,956, and a continuation-in-part of application No. 10/828,745, filed on Apr. 21, 2004, now abandoned.

(51) Int. Cl.
*G01C 21/00* (2006.01)
(52) U.S. Cl. .............. 701/468; 342/357.27; 342/357.26
(58) Field of Classification Search .............. 701/1, 408, 701/411, 412, 422, 468, 470; 342/357.02, 342/357.03, 357.01, 357.06, 357.27, 357.26, 342/357.34, 357.36; 455/502, 456.1; 702/166; 717/106
See application file for complete search history.

(56) References Cited

U.S. PATENT DOCUMENTS 3,585,537 A 6/1971 Rennick et al.
(Continued)

FOREIGN PATENT DOCUMENTS

JP 07244150 9/1995
(Continued)

OTHER PUBLICATIONS

"International Search Report", PCT/US09/067693, (Jan. 26, 2010).
(Continued)

*Primary Examiner* — Thomas G. Black
*Assistant Examiner* — Marthe Marc-Coleman
(74) *Attorney, Agent, or Firm* — Law Office of Mark Brown, LLC; Mark E. Brown

(57) ABSTRACT

A method for locating GNSS-defined points, distances, directional attitudes and closed geometric shapes includes the steps of providing a base with a base GNSS antenna and providing a rover with a rover GNSS antenna and receiver. The receiver is connected to the rover GNSS antenna and is connected to the base GNSS antenna by an RF cable. The receiver thereby simultaneously processes signals received at the antennas. The method includes determining a vector directional arrow from the differential positions of the antennas and calculating a distance between the antennas, which can be sequentially chained together for determining a cumulative distance in a "digital tape measure" mode of operation. A localized RTK surveying method uses the rover antenna for determining relative or absolute point locations. A system includes a base with an antenna, a rover with an antenna and a receiver, with the receiver being connected to the antennas. A processor is provided for computing positions, directional vectors, areas and other related tasks.

21 Claims, 11 Drawing Sheets

COMBINED MASTER/SLAVE

U.S. PATENT DOCUMENTS

| | | |
|---|---|---|
| 3,596,228 A | 7/1971 | Reed, Jr. et al. |
| 3,727,710 A | 4/1973 | Sanders et al. |
| 3,815,272 A | 6/1974 | Marleau |
| 3,899,028 A | 8/1975 | Morris et al. |
| 3,987,456 A | 10/1976 | Gelin |
| 4,132,272 A | 1/1979 | Holloway et al. |
| 4,170,776 A | 10/1979 | MacDoran et al. |
| 4,180,133 A | 12/1979 | Collogan et al. |
| 4,398,162 A | 8/1983 | Nagai |
| 4,453,614 A | 6/1984 | Allen et al. |
| 4,529,990 A | 7/1985 | Brunner |
| 4,637,474 A | 1/1987 | Leonard |
| 4,667,203 A | 5/1987 | Counselman, III |
| 4,689,556 A | 8/1987 | Cedrone |
| 4,694,264 A | 9/1987 | Owens et al. |
| 4,710,775 A | 12/1987 | Coe |
| 4,714,435 A | 12/1987 | Stipanuk et al. |
| 4,739,448 A | 4/1988 | Rowe et al. |
| 4,751,512 A | 6/1988 | Longaker |
| 4,769,700 A | 9/1988 | Pryor |
| 4,785,463 A | 11/1988 | Janc et al. |
| 4,802,545 A | 2/1989 | Nystuen et al. |
| 4,812,991 A | 3/1989 | Hatch |
| 4,858,132 A | 8/1989 | Holmquist |
| 4,864,320 A | 9/1989 | Munson et al. |
| 4,894,662 A | 1/1990 | Counselman |
| 4,916,577 A | 4/1990 | Dawkins |
| 4,918,607 A | 4/1990 | Wible |
| 4,963,889 A | 10/1990 | Hatch |
| 5,031,704 A | 7/1991 | Fleischer et al. |
| 5,100,229 A | 3/1992 | Lundberg et al. |
| 5,134,407 A | 7/1992 | Lorenz et al. |
| 5,148,179 A | 9/1992 | Allison |
| 5,152,347 A | 10/1992 | Miller |
| 5,155,490 A | 10/1992 | Spradley et al. |
| 5,155,493 A | 10/1992 | Thursby et al. |
| 5,156,219 A | 10/1992 | Schmidt et al. |
| 5,165,109 A | 11/1992 | Han et al. |
| 5,173,715 A | 12/1992 | Rodal et al. |
| 5,177,489 A | 1/1993 | Hatch |
| 5,185,610 A | 2/1993 | Ward et al. |
| 5,191,351 A | 3/1993 | Hofer et al. |
| 5,202,829 A | 4/1993 | Geier |
| 5,207,239 A | 5/1993 | Schwitalla |
| 5,239,669 A | 8/1993 | Mason et al. |
| 5,255,756 A | 10/1993 | Follmer et al. |
| 5,268,695 A | 12/1993 | Dentinger et al. |
| 5,293,170 A | 3/1994 | Lorenz et al. |
| 5,294,970 A | 3/1994 | Dornbusch et al. |
| 5,296,861 A | 3/1994 | Knight |
| 5,311,149 A | 5/1994 | Wagner et al. |
| 5,323,322 A | 6/1994 | Mueller et al. |
| 5,334,987 A | 8/1994 | Teach |
| 5,343,209 A | 8/1994 | Sennott et al. |
| 5,345,245 A | 9/1994 | Ishikawa et al. |
| 5,359,332 A | 10/1994 | Allison et al. |
| 5,361,212 A | 11/1994 | Class et al. |
| 5,365,447 A | 11/1994 | Dennis |
| 5,369,589 A | 11/1994 | Steiner |
| 5,375,059 A | 12/1994 | Kyrtsos et al. |
| 5,390,124 A | 2/1995 | Kyrtsos |
| 5,390,125 A | 2/1995 | Sennott et al. |
| 5,390,207 A | 2/1995 | Fenton et al. |
| 5,416,712 A | 5/1995 | Geier et al. |
| 5,442,363 A | 8/1995 | Remondi |
| 5,444,453 A | 8/1995 | Lalezari |
| 5,451,964 A | 9/1995 | Babu |
| 5,467,282 A | 11/1995 | Dennis |
| 5,471,217 A | 11/1995 | Hatch et al. |
| 5,476,147 A | 12/1995 | Fixemer |
| 5,477,228 A | 12/1995 | Tiwari et al. |
| 5,477,458 A | 12/1995 | Loomis |
| 5,490,073 A | 2/1996 | Kyrtsos |
| 5,491,636 A | 2/1996 | Robertson |
| 5,495,257 A | 2/1996 | Loomis |
| 5,504,482 A | 4/1996 | Schreder |
| 5,511,623 A | 4/1996 | Frasier |
| 5,519,620 A | 5/1996 | Talbot et al. |
| 5,521,610 A | 5/1996 | Rodal |
| 5,523,761 A | 6/1996 | Gildea |
| 5,534,875 A | 7/1996 | Diefes et al. |
| 5,543,804 A | 8/1996 | Buchler et al. |
| 5,546,093 A | 8/1996 | Gudat et al. |
| 5,548,293 A | 8/1996 | Cohen et al. |
| 5,561,432 A | 10/1996 | Knight |
| 5,563,786 A | 10/1996 | Torii |
| 5,568,152 A | 10/1996 | Janky et al. |
| 5,568,162 A | 10/1996 | Samsel et al. |
| 5,583,513 A | 12/1996 | Cohen |
| 5,589,835 A | 12/1996 | Gildea et al. |
| 5,592,382 A | 1/1997 | Colley |
| 5,596,328 A | 1/1997 | Stangeland |
| 5,600,670 A | 2/1997 | Turney |
| 5,604,506 A | 2/1997 | Rodal |
| 5,608,393 A | 3/1997 | Hartman |
| 5,610,522 A | 3/1997 | Locatelli et al. |
| 5,610,616 A | 3/1997 | Vallot et al. |
| 5,610,845 A | 3/1997 | Slabinski |
| 5,612,883 A | 3/1997 | Shaffer et al. |
| 5,615,116 A | 3/1997 | Gudat et al. |
| 5,617,100 A | 4/1997 | Akiyoshi et al. |
| 5,617,317 A | 4/1997 | Ignagni |
| 5,621,646 A | 4/1997 | Enge et al. |
| 5,638,077 A | 6/1997 | Martin |
| 5,644,139 A | 7/1997 | Allen et al. |
| 5,664,632 A | 9/1997 | Frasier |
| 5,673,491 A | 10/1997 | Brenna et al. |
| 5,680,140 A | 10/1997 | Loomis |
| 5,684,696 A | 11/1997 | Rao et al. |
| 5,706,015 A | 1/1998 | Chen et al. |
| 5,717,593 A | 2/1998 | Gvili |
| 5,725,230 A | 3/1998 | Walkup |
| 5,731,786 A | 3/1998 | Abraham et al. |
| 5,739,785 A | 4/1998 | Allison et al. |
| 5,757,316 A | 5/1998 | Buchler |
| 5,765,123 A | 6/1998 | Nimura et al. |
| 5,777,578 A | 7/1998 | Chang et al. |
| 5,810,095 A | 9/1998 | Orbach et al. |
| 5,828,336 A | 10/1998 | Yunck et al. |
| 5,838,562 A | 11/1998 | Gudat et al. |
| 5,854,987 A | 12/1998 | Sekine et al. |
| 5,862,501 A | 1/1999 | Talbot et al. |
| 5,864,315 A | 1/1999 | Welles et al. |
| 5,864,318 A | 1/1999 | Cosenza et al. |
| 5,875,408 A | 2/1999 | Bendett et al. |
| 5,877,725 A | 3/1999 | Kalafus |
| 5,890,091 A | 3/1999 | Talbot et al. |
| 5,899,957 A | 5/1999 | Loomis |
| 5,906,645 A | 5/1999 | Kagawa et al. |
| 5,912,798 A | 6/1999 | Chu |
| 5,914,685 A | 6/1999 | Kozlov et al. |
| 5,917,448 A | 6/1999 | Mickelson |
| 5,918,558 A | 7/1999 | Susag |
| 5,919,242 A | 7/1999 | Greatline et al. |
| 5,923,270 A | 7/1999 | Sampo et al. |
| 5,926,079 A | 7/1999 | Heine et al. |
| 5,927,603 A | 7/1999 | McNabb |
| 5,928,309 A | 7/1999 | Korver et al. |
| 5,929,721 A | 7/1999 | Munn et al. |
| 5,930,743 A * | 7/1999 | Warren .................. 702/166 |
| 5,933,110 A | 8/1999 | Tang et al. |
| 5,935,183 A | 8/1999 | Sahm et al. |
| 5,936,573 A | 8/1999 | Smith |
| 5,940,026 A | 8/1999 | Popeck |
| 5,941,317 A | 8/1999 | Mansur |
| 5,943,008 A | 8/1999 | Van Dusseldorp |
| 5,944,770 A | 8/1999 | Enge et al. |
| 5,945,917 A | 8/1999 | Harry |
| 5,949,371 A | 9/1999 | Nichols |
| 5,955,973 A | 9/1999 | Anderson |
| 5,956,250 A | 9/1999 | Gudat et al. |
| 5,969,670 A | 10/1999 | Kalafus et al. |
| 5,987,383 A | 11/1999 | Keller et al. |
| 6,014,101 A | 1/2000 | Loomis |
| 6,014,608 A | 1/2000 | Seo |
| 6,018,313 A | 1/2000 | Engelmayer et al. |
| 6,023,239 A | 2/2000 | Kovach |

| | | | |
|---|---|---|---|
| 6,052,647 A | 4/2000 | Parkinson et al. | |
| 6,055,477 A | 4/2000 | McBurney et al. | |
| 6,057,800 A | 5/2000 | Yang et al. | |
| 6,061,390 A | 5/2000 | Meehan et al. | |
| 6,061,632 A | 5/2000 | Dreier | |
| 6,062,317 A | 5/2000 | Gharsalli | |
| 6,069,583 A | 5/2000 | Silvestrin et al. | |
| 6,076,612 A | 6/2000 | Carr et al. | |
| 6,081,171 A | 6/2000 | Ella | |
| 6,100,842 A | 8/2000 | Dreier et al. | |
| 6,104,978 A | 8/2000 | Harrison et al. | |
| 6,122,595 A | 9/2000 | Varley et al. | |
| 6,128,574 A | 10/2000 | Diekhans | |
| 6,144,335 A | 11/2000 | Rogers | |
| 6,191,730 B1 | 2/2001 | Nelson, Jr. | |
| 6,191,733 B1 | 2/2001 | Dizchavez | |
| 6,198,430 B1 | 3/2001 | Hwang et al. | |
| 6,198,992 B1 | 3/2001 | Winslow | |
| 6,199,000 B1 | 3/2001 | Keller et al. | |
| 6,205,401 B1 | 3/2001 | Pickhard et al. | |
| 6,215,828 B1 | 4/2001 | Signell et al. | |
| 6,229,479 B1 | 5/2001 | Kozlov et al. | |
| 6,230,097 B1 | 5/2001 | Dance et al. | |
| 6,233,511 B1 | 5/2001 | Berger et al. | |
| 6,236,916 B1 | 5/2001 | Staub et al. | |
| 6,236,924 B1 | 5/2001 | Motz et al. | |
| 6,253,160 B1 | 6/2001 | Hanseder | |
| 6,256,583 B1 | 7/2001 | Sutton | |
| 6,259,398 B1 | 7/2001 | Riley | |
| 6,266,595 B1 | 7/2001 | Greatline et al. | |
| 6,285,320 B1 | 9/2001 | Olster et al. | |
| 6,292,132 B1 | 9/2001 | Wilson | |
| 6,307,505 B1 | 10/2001 | Green | |
| 6,313,788 B1 | 11/2001 | Wilson | |
| 6,314,348 B1 | 11/2001 | Winslow | |
| 6,325,684 B1 | 12/2001 | Knight | |
| 6,336,066 B1 | 1/2002 | Pellenc et al. | |
| 6,345,231 B2 | 2/2002 | Quincke | |
| 6,356,602 B1 | 3/2002 | Rodal et al. | |
| 6,377,889 B1 | 4/2002 | Soest | |
| 6,380,888 B1 | 4/2002 | Kucik | |
| 6,389,345 B2 | 5/2002 | Phelps | |
| 6,392,589 B1 | 5/2002 | Rogers et al. | |
| 6,397,147 B1 | 5/2002 | Whitehead | |
| 6,415,229 B1 | 7/2002 | Diekhans | |
| 6,418,031 B1 | 7/2002 | Archambeault | |
| 6,421,003 B1 | 7/2002 | Riley et al. | |
| 6,424,915 B1 | 7/2002 | Fukuda et al. | |
| 6,431,576 B1 | 8/2002 | Viaud et al. | |
| 6,434,462 B1 | 8/2002 | Bevly et al. | |
| 6,445,983 B1 | 9/2002 | Dickson et al. | |
| 6,445,990 B1 | 9/2002 | Manring | |
| 6,449,558 B1 | 9/2002 | Small | |
| 6,463,091 B1 | 10/2002 | Zhodzicshsky et al. | |
| 6,463,374 B1 | 10/2002 | Keller et al. | |
| 6,466,871 B1 | 10/2002 | Reisman et al. | |
| 6,469,663 B1 | 10/2002 | Whitehead et al. | |
| 6,484,097 B2 | 11/2002 | Fuchs et al. | |
| 6,501,422 B1 | 12/2002 | Nichols | |
| 6,515,619 B1 | 2/2003 | McKay, Jr. | |
| 6,516,271 B2 | 2/2003 | Upadhyaya et al. | |
| 6,539,303 B2 | 3/2003 | McClure et al. | |
| 6,542,077 B2 | 4/2003 | Joao | |
| 6,549,835 B2 | 4/2003 | Deguchi | |
| 6,553,299 B1 | 4/2003 | Keller et al. | |
| 6,553,300 B2 | 4/2003 | Ma et al. | |
| 6,553,311 B2 | 4/2003 | Ahearn et al. | |
| 6,570,534 B2 | 5/2003 | Cohen et al. | |
| 6,577,952 B2 | 6/2003 | Geier et al. | |
| 6,587,761 B2 | 7/2003 | Kumar | |
| 6,606,542 B2 | 8/2003 | Hauwiller et al. | |
| 6,611,228 B2 | 8/2003 | Toda et al. | |
| 6,611,754 B2 | 8/2003 | Klein | |
| 6,611,755 B1 | 8/2003 | Coffee et al. | |
| 6,622,091 B2 | 9/2003 | Perlmutter et al. | |
| 6,631,394 B1 | 10/2003 | Ronkka et al. | |
| 6,631,916 B1 | 10/2003 | Miller | |
| 6,643,576 B1 | 11/2003 | O'Connor et al. | |
| 6,646,603 B2 | 11/2003 | Dooley et al. | |
| 6,657,875 B1 | 12/2003 | Zeng et al. | |
| 6,671,587 B2 | 12/2003 | Hrovat et al. | |
| 6,686,878 B1 | 2/2004 | Lange | |
| 6,688,403 B2 | 2/2004 | Bernhardt et al. | |
| 6,703,973 B1 | 3/2004 | Nichols | |
| 6,711,501 B2 | 3/2004 | McClure et al. | |
| 6,721,638 B2 | 4/2004 | Zeitler | |
| 6,732,024 B2 | 5/2004 | Rekow et al. | |
| 6,744,404 B1 | 6/2004 | Whitehead et al. | |
| 6,754,584 B2 | 6/2004 | Pinto et al. | |
| 6,774,843 B2 | 8/2004 | Takahashi | |
| 6,792,380 B2 | 9/2004 | Toda | |
| 6,819,269 B2 | 11/2004 | Flick | |
| 6,822,314 B2 | 11/2004 | Beasom | |
| 6,865,465 B2 | 3/2005 | McClure | |
| 6,865,484 B2 | 3/2005 | Miyasaka et al. | |
| 6,879,283 B1 | 4/2005 | Bird et al. | |
| 6,900,992 B2 | 5/2005 | Kelly et al. | |
| 6,922,635 B2 | 7/2005 | Rorabaugh | |
| 6,931,233 B1 | 8/2005 | Tso et al. | |
| 6,961,018 B2 | 11/2005 | Heppe et al. | |
| 6,967,538 B2 | 11/2005 | Woo | |
| 6,990,399 B2 | 1/2006 | Hrazdera et al. | |
| 7,006,032 B2 | 2/2006 | King et al. | |
| 7,026,982 B2 | 4/2006 | Toda et al. | |
| 7,027,918 B2 | 4/2006 | Zimmerman et al. | |
| 7,031,725 B2 | 4/2006 | Rorabaugh | |
| 7,089,099 B2 | 8/2006 | Shostak et al. | |
| 7,142,956 B2 | 11/2006 | Heiniger et al. | |
| 7,155,335 B2 | 12/2006 | Rennels | |
| 7,162,348 B2 | 1/2007 | McClure et al. | |
| 7,191,061 B2 | 3/2007 | McKay et al. | |
| 7,221,314 B2 | 5/2007 | Brabec et al. | |
| 7,231,290 B2 | 6/2007 | Steichen et al. | |
| 7,248,211 B2 | 7/2007 | Hatch et al. | |
| 7,271,766 B2 | 9/2007 | Zimmerman et al. | |
| 7,277,784 B2 | 10/2007 | Weiss | |
| 7,292,186 B2 | 11/2007 | Miller et al. | |
| 7,324,915 B2 | 1/2008 | Altman | |
| 7,358,896 B2 | 4/2008 | Gradincic et al. | |
| 7,373,231 B2 | 5/2008 | McClure et al. | |
| 7,388,539 B2 | 6/2008 | Whitehead et al. | |
| 7,395,769 B2 | 7/2008 | Jensen | |
| 7,428,259 B2 | 9/2008 | Wang et al. | |
| 7,437,230 B2 | 10/2008 | McClure et al. | |
| 7,451,030 B2 | 11/2008 | Eglington et al. | |
| 7,479,900 B2 | 1/2009 | Horstemeyer | |
| 7,505,848 B2 | 3/2009 | Flann et al. | |
| 7,522,099 B2 | 4/2009 | Zhodzishsky et al. | |
| 7,522,100 B2 | 4/2009 | Yang et al. | |
| 7,571,029 B2 | 8/2009 | Dai et al. | |
| 7,689,354 B2 | 3/2010 | Heiniger et al. | |
| 2003/0014171 A1 | 1/2003 | Ma et al. | |
| 2003/0093210 A1 | 5/2003 | Kondo et al. | |
| 2003/0187560 A1 | 10/2003 | Keller et al. | |
| 2003/0195008 A1* | 10/2003 | Mohi et al. | 455/456.5 |
| 2003/0208319 A1 | 11/2003 | Ell et al. | |
| 2004/0039514 A1 | 2/2004 | Steichen et al. | |
| 2004/0130485 A1* | 7/2004 | Rapoport et al. | 342/357.03 |
| 2004/0212533 A1 | 10/2004 | Whitehead et al. | |
| 2005/0080559 A1 | 4/2005 | Ishibashi et al. | |
| 2005/0225955 A1 | 10/2005 | Grebenkemper et al. | |
| 2005/0265494 A1 | 12/2005 | Goodings | |
| 2006/0031664 A1 | 2/2006 | Wilson et al. | |
| 2006/0167600 A1 | 7/2006 | Nelson et al. | |
| 2006/0206246 A1 | 9/2006 | Walker | |
| 2006/0215739 A1 | 9/2006 | Williamson et al. | |
| 2007/0078570 A1 | 4/2007 | Dai et al. | |
| 2007/0088447 A1 | 4/2007 | Stothert et al. | |
| 2007/0121708 A1 | 5/2007 | Simpson | |
| 2007/0205940 A1 | 9/2007 | Yang et al. | |
| 2007/0285308 A1 | 12/2007 | Bauregger et al. | |
| 2008/0129586 A1 | 6/2008 | Martin | |
| 2008/0204312 A1 | 8/2008 | Euler | |
| 2009/0171583 A1 | 7/2009 | DiEsposti | |
| 2009/0174597 A1 | 7/2009 | DiLellio et al. | |
| 2009/0174622 A1 | 7/2009 | Kanou | |
| 2009/0177395 A1 | 7/2009 | Stelpstra | |
| 2009/0177399 A1 | 7/2009 | Park et al. | |

| | | |
|---|---|---|
| 2009/0259397 A1 | 10/2009 | Stanton |
| 2009/0259707 A1 | 10/2009 | Martin et al. |
| 2009/0262014 A1 | 10/2009 | Diesposti |
| 2009/0262018 A1 | 10/2009 | Vasilyev et al. |
| 2009/0262974 A1 | 10/2009 | Lithopoulos |
| 2009/0265054 A1 | 10/2009 | Basnayake |
| 2009/0265101 A1 | 10/2009 | Jow |
| 2009/0265104 A1 | 10/2009 | Shroff |
| 2009/0273372 A1 | 11/2009 | Brenner |
| 2009/0273513 A1 | 11/2009 | Huang |
| 2009/0274079 A1 | 11/2009 | Bhatia et al. |
| 2009/0274113 A1 | 11/2009 | Katz |
| 2009/0276155 A1 | 11/2009 | Jeerage et al. |
| 2009/0295633 A1 | 12/2009 | Pinto et al. |
| 2009/0295634 A1 | 12/2009 | Yu et al. |
| 2009/0299550 A1 | 12/2009 | Baker |
| 2009/0322597 A1 | 12/2009 | Medina Herrero et al. |
| 2009/0322598 A1 | 12/2009 | Fly et al. |
| 2009/0322600 A1 | 12/2009 | Whitehead et al. |
| 2009/0322601 A1 | 12/2009 | Ladd et al. |
| 2009/0322606 A1 | 12/2009 | Gronemeyer |
| 2009/0326809 A1 | 12/2009 | Colley et al. |
| 2010/0013703 A1 | 1/2010 | Tekawy et al. |
| 2010/0026569 A1 | 2/2010 | Amidi |
| 2010/0030470 A1 | 2/2010 | Wang et al. |
| 2010/0039316 A1 | 2/2010 | Gronemeyer et al. |
| 2010/0039318 A1 | 2/2010 | Kmiecik |
| 2010/0039320 A1 | 2/2010 | Boyer et al. |
| 2010/0039321 A1 | 2/2010 | Abraham |
| 2010/0060518 A1 | 3/2010 | Bar-Sever et al. |
| 2010/0063649 A1 | 3/2010 | Wu et al. |
| 2010/0084147 A1 | 4/2010 | Aral |
| 2010/0085249 A1 | 4/2010 | Ferguson et al. |
| 2010/0085253 A1 | 4/2010 | Ferguson et al. |
| 2010/0103033 A1 | 4/2010 | Roh |
| 2010/0103034 A1 | 4/2010 | Tobe et al. |
| 2010/0103038 A1 | 4/2010 | Yeh et al. |
| 2010/0103040 A1 | 4/2010 | Broadbent |
| 2010/0106414 A1 | 4/2010 | Whitehead |
| 2010/0106445 A1 | 4/2010 | Kondoh |
| 2010/0109944 A1 | 5/2010 | Whitehead et al. |
| 2010/0109945 A1 | 5/2010 | Roh |
| 2010/0109947 A1 | 5/2010 | Rintanen |
| 2010/0109948 A1 | 5/2010 | Razoumov et al. |
| 2010/0109950 A1 | 5/2010 | Roh |
| 2010/0111372 A1 | 5/2010 | Zheng et al. |
| 2010/0114483 A1 | 5/2010 | Heo et al. |
| 2010/0117894 A1 | 5/2010 | Velde et al. |
| 2010/0117899 A1 | 5/2010 | Papadimitratos et al. |
| 2010/0117900 A1 | 5/2010 | van Diggelen et al. |
| 2010/0121577 A1 | 5/2010 | Zhang et al. |
| 2010/0124210 A1 | 5/2010 | Lo |
| 2010/0124212 A1 | 5/2010 | Lo |
| 2010/0134354 A1 | 6/2010 | Lennen |
| 2010/0149025 A1 | 6/2010 | Meyers et al. |
| 2010/0149030 A1 | 6/2010 | Verma et al. |
| 2010/0149033 A1 | 6/2010 | Abraham |
| 2010/0149034 A1 | 6/2010 | Chen |
| 2010/0149037 A1 | 6/2010 | Cho |
| 2010/0150284 A1 | 6/2010 | Fielder et al. |
| 2010/0152949 A1 | 6/2010 | Nunan et al. |
| 2010/0156709 A1 | 6/2010 | Zhang et al. |
| 2010/0156712 A1 | 6/2010 | Pisz et al. |
| 2010/0156718 A1 | 6/2010 | Chen |
| 2010/0159943 A1 | 6/2010 | Salmon |
| 2010/0161179 A1 | 6/2010 | McClure et al. |
| 2010/0161211 A1 | 6/2010 | Chang |
| 2010/0161568 A1 | 6/2010 | Xiao |
| 2010/0171660 A1 | 7/2010 | Shyr et al. |
| 2010/0171757 A1 | 7/2010 | Melamed |
| 2010/0185364 A1 | 7/2010 | McClure |
| 2010/0185366 A1 | 7/2010 | Heiniger et al. |
| 2010/0185389 A1 | 7/2010 | Woodard |
| 2010/0188285 A1 | 7/2010 | Collins |
| 2010/0188286 A1 | 7/2010 | Bickerstaff et al. |
| 2010/0189163 A1 | 7/2010 | Burgi et al. |
| 2010/0207811 A1 | 8/2010 | Lackey |
| 2010/0210206 A1 | 8/2010 | Young |
| 2010/0211248 A1 | 8/2010 | Craig et al. |
| 2010/0211315 A1 | 8/2010 | Toda |
| 2010/0211316 A1 | 8/2010 | DaSilva et al. |
| 2010/0220004 A1 | 9/2010 | Malkos et al. |
| 2010/0220008 A1 | 9/2010 | Conover et al. |
| 2010/0222076 A1 | 9/2010 | Poon et al. |
| 2010/0225537 A1 | 9/2010 | Abraham |
| 2010/0228408 A1 | 9/2010 | Ford |
| 2010/0228480 A1 | 9/2010 | Lithgow et al. |
| 2010/0231443 A1 | 9/2010 | Whitehead |
| 2010/0231446 A1 | 9/2010 | Marshall et al. |
| 2010/0232351 A1 | 9/2010 | Chansarkar et al. |
| 2010/0235093 A1 | 9/2010 | Chang |
| 2010/0238976 A1 | 9/2010 | Young |
| 2010/0241347 A1 | 9/2010 | King et al. |
| 2010/0241353 A1 | 9/2010 | Park |
| 2010/0241441 A1 | 9/2010 | Page et al. |
| 2010/0241864 A1 | 9/2010 | Kelley et al. |

FOREIGN PATENT DOCUMENTS

| | | |
|---|---|---|
| WO | WO9836288 | 8/1998 |
| WO | WO0024239 | 5/2000 |
| WO | WO03019430 | 3/2003 |
| WO | WO2005/119386 | 12/2005 |
| WO | WO2009/066183 | 5/2009 |
| WO | WO-2009082745 | 7/2009 |
| WO | WO-2010005945 | 7/2009 |
| WO | WO2009126587 | 10/2009 |
| WO | WO2009/148638 | 12/2009 |
| WO | WO-2010104782 | 9/2010 |
| WO | WO-2011014431 | 2/2011 |

OTHER PUBLICATIONS

Rho, Hyundho et al., "Dual-Frequency GPS Precise Point Positioning with WADGPS Corrections", [retrieved on May 18, 2010]. Retrieved from the Internet: ,URL: http://gauss.gge.unb.ca/papers.pdf/iongnss2005.rho.wadgps.pdf, (Jul. 12, 2006).

"Eurocontrol, Pegasus Technical Notes on SBAS", report [online], Dec. 7, 2004 [retrieved on May 18, 2010]. Retrieved from the Internet: <URL: http://www.icao.int/icao/en/ro/nacc/meetings/2004/gnss/documentation/Pegasus/tn.pdf>, (Dec. 7, 2004), p. 89 paras [0001]-[0004].

"ARINC Engineering Services, Interface Specification IS-GPS-200, Revision D", Online [retrieved on May 18, 2010]. Retrieved from the Internet:<URL: http://www.navcen.uscg.gov/gps/geninfo/IS-GPS-200D.pdf>, (Dec. 7, 2004), p. 168 para [0001].

Schaer, et al., "Determination and Use of GPS Differential Code Bias Values", Presentation [online]. Revtrieved May 18, 2010. Retrieved from the internet: <http://nng.esoc.esa.de/ws2006/REPR2.pdf>. (May 8, 2006).

"International Search Report", PCT/US10/26509, (Apr. 20, 2010).

Parkinson, Bradford W., et al., "Global Positioning System: Theory and Applications, vol. II", Bradford W. Parkinson and James J. Spiker, Jr., eds., *Global Postioning System: Theory and Applicaitons*, vol. II, 1995, AIAA, Reston, VA, USA, pp. 3-50, (1995),3-50.

"Orthman Manufacturing Co., www.orthman.com/htm;guidance.htm", 2004, regarding the "Tracer Quick-Hitch".

Lin, Dai et al., "Real-time Attitude Determination fro Microsatellite by Lamda Method Combined with Kalman Filtering", *A Collection fof the 22nd AIAA International Communications Satellite Systems Conference and Exhibit Technical Paers* vol. 1, Monetrey, California American Institute of Aeronautics and Astronautics, Inc., (May 2004),136-143.

Xu, Jiangning et al., "An EHW Architecture for Real-Time GPS Attitude Determination Based on Parallel Genetic Algorithm", *The Computer SocietyProceedings of the 2002 NASA/DOD Conference on Evolvable Hardware* (EH'02), (2002).

Han, Shaowel et al., "Single-Epoch Ambiguity Resolution for Real-Time GPS Attitude Determination with the Aid of One-Dimensional Optical Fiber Gyro" *GPS Solutions*, vol. 3, No. 1, pp. 5-12 (1999) *John Wiley & Sons, Inc.*

Park, Chansik et al., "Integer Ambiguity Resolution for GPS Based Attitude Determination System", *SICE 1998*, Jul. 29-31, Chiba, 1115-1120.

Last, J. D., et al., "Effect of skywave interference on coverage of radiobeacon DGPS stations", *IEEE Proc.-Radar, Sonar Navig.*, vol. 144, No. 3, Jun. 1997, pp. 163-168.

"International Search Report and Written Opinion", PCT/US2004/015678, filed May 17, 2004, Jun. 21, 2005.

"ISO", 11783 Part 7 Draft Amendment 1 Annex, Paragraphs B.6 and B.7.ISO.11783-7 2004 DAM1, ISO: Mar. 8, 2004.

Kaplan, E D., "Understanding GPS: Principles and Applications", *Artech House*, MA, 1996.

Irsigler, M et al., "PPL Tracking Performance in the Presence of Oscillator Phase Noise" *GPS Solutions*, vol. 5, No. 4, pp. 45-57 (2002).

Ward, Phillip W., "Performance Comparisons Between FLL, PLL and a Novel FLL-Assisted-PLL Carrier Tracking Loop Under RF Interference Conditions", *11th Int. Tech Meeting of the Satellite Division of the U.S. Inst. of Navigation*, Nashville, TN, Sep. 15-18, 783-795, 1998.

Bevly, David M., "Comparison of INS v. Carrier-Phase DGPS for Attitude Determination in the Control of Off-Road Vehicles" *ION 55th Annual Meeting*; Jun. 28-30, 1999; Cambridge, Massachusetts; pp. 497-504.

Keicher, R. et al., "Automatic Guidance for Agricultural Vehicles in Europe", *Computers and Electronics in Agriculture*, vol. 25, (Jan. 2000),169-194.

"International Search Report", PCT/US09/49776, (Aug. 11, 2009).

"International Search Report", PCT/AU/2008/000002, (Feb. 28, 2008).

"International Search Report", PCT/US09/33693, (Mar. 30, 2009).

"International Search Report", PCT/US09/039686, (May 26, 2009).

"International Search Report,", PCT/US09/34376, (Nov. 2, 2009).

Takac, Frank et al., "SmartRTK: A Novel Method of Processing Standardised RTCM Network RTK Information for High Precision Positioning". *Proceedings of ENC GNSS 2008*, Toulouse, France,(Apr. 22, 2008).

"International Search Report", PCT/US09/33567, (Feb. 9, 2009).

"International Search Report and Written Opinion", PCT/IB2008/003796 (Jul. 15, 2009).

"International Search Report / Written Opinion", PCT/US09/63594, (Jan. 11, 2010).

"International Search Report", PCT/US09/60668, (Dec. 9, 2009).

"International Search Report and Written Opinion", PCT/US10/21334, (Mar. 12, 2010).

"International Search Report and Written Opinion", International Searching Authortiy, PCT/US08/88070, Feb. 9, 2009.

"ISR Notification & Written Opinion", PCT/US10/26509, (Apr. 20, 2010),1-7.

"Notification Concerning Transmittal of International Report on Patentability (PCT)", PCT/US2009/049776, (Jan. 20, 2011).

"Notification of Transmittal of InternatinalPrelim. Report of Patentability", International Application No. PCT/US09/039686, (Oct. 21, 2010).

"International Search Report and Written Opinion", PCT/US2010/043094, (Sep. 17, 2010).

"Notification of Publication of International Application", WO 2011/014431, (Feb. 3, 2011).

"International Search Report and Written Opinion", PCT/US08/81727, (Dec. 23, 2008).

* cited by examiner

COMBINED MASTER/SLAVE

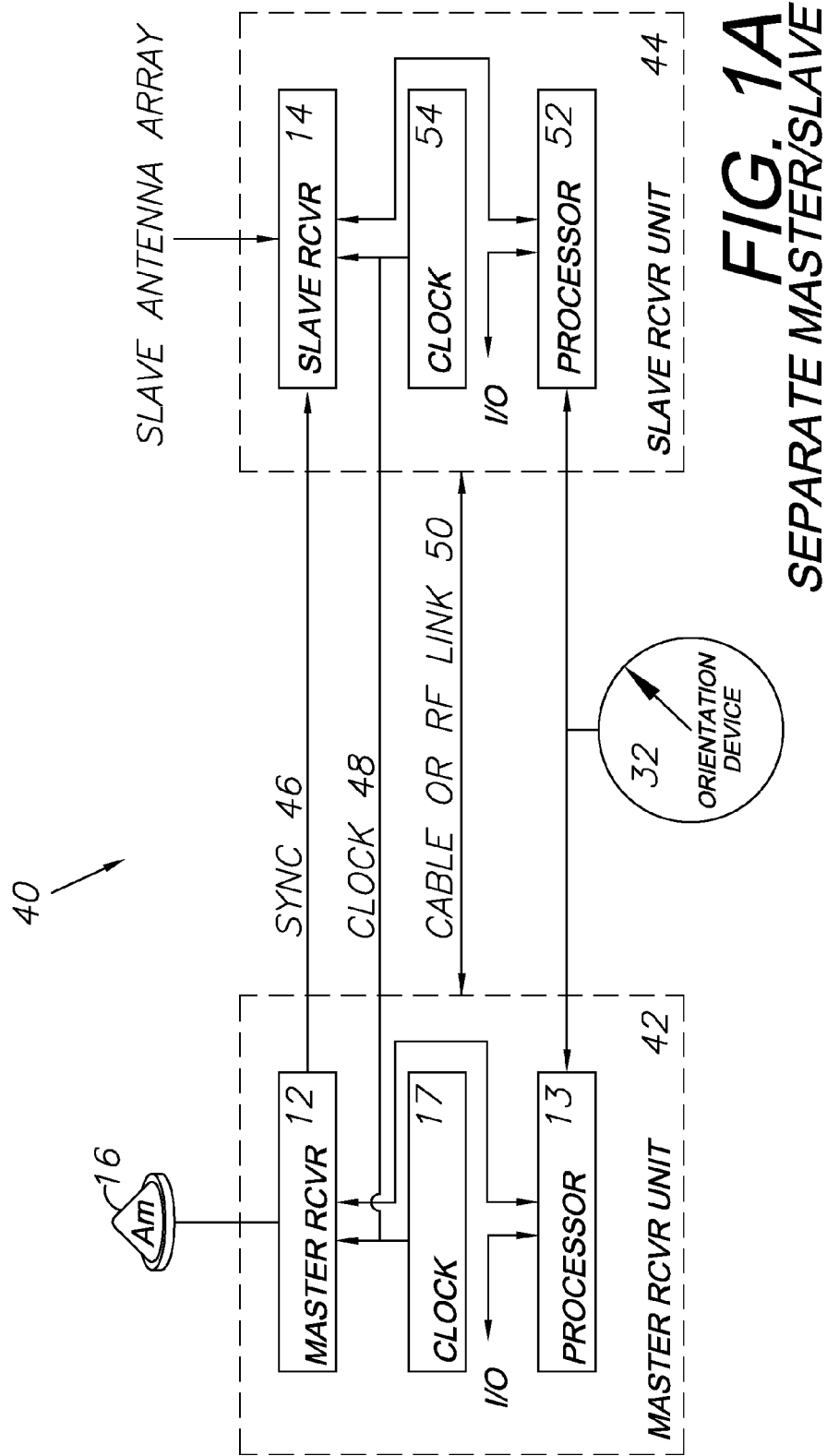

L1 RTK W/ MULTI ANT

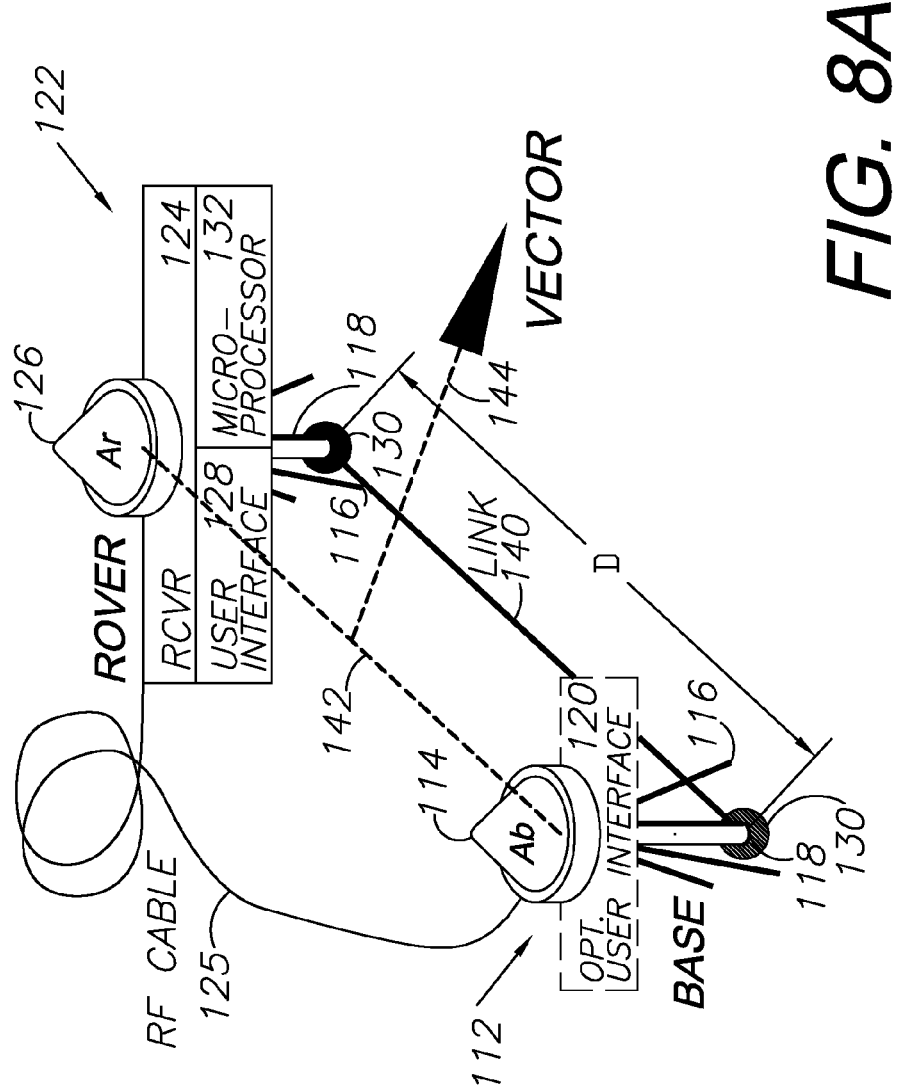

SURVEY/GIS RTK

Fig. 10

METHOD AND SYSTEM USING GNSS PHASE MEASUREMENTS FOR RELATIVE POSITIONING

CROSS-REFERENCES TO RELATED APPLICATIONS

This application is a continuation-in-part of and claims the benefit of: U.S. patent applications Ser. No. 12/355,776 (4007.2), filed Jan. 17, 2009, which is a continuation-in-part of and claims the benefit of Ser. No. 12/171,399 (4007.1), filed Jul. 11, 2008, which is a continuation-in-part of and claims the benefit Ser. No. 10/804,758 (4007), filed Mar. 19, 2004, now U.S. Pat. No. 7,400,956; and Ser.No. 12/171,399 (4011.1), filed Jul. 11, 2008, which is a continuation-in-part of and claims the benefit of Ser. No. 10/828,745 (4011), filed Apr. 21, 2004 now abandoned; and U.S. Provisional Patent Applications No. 60/456,146, filed Mar. 20, 2003, and No. 60/464,756, filed Apr. 23, 2003. The contents of all of the aforementioned applications are incorporated by reference herein in their entireties.

BACKGROUND OF THE INVENTION

The invention relates generally to Global Navigation Satellite System (GNSS) receivers and more particularly to a method and an apparatus for computing multiple precise locations using differential carrier phases of a GNSS satellite signal by synchronizing the clocks between the master receiver and the slave receiver. It further relates to a technique of connecting a plurality of antennas to the slave receiver, which can be switched on to measure each antenna's relative location to the master antenna for monitoring long-term deformation. Still further, the invention relates to surveying and measuring applications of a multi-antenna, single-receiver vector GNSS system using RTK techniques.

GNSS Background

GNSS includes the Global Positioning System (GPS), which was established by the United States government, and employs a constellation of 24 or more satellites in well-defined orbits at an altitude of approximately 26,500 km. These satellites continually transmit microwave L-band radio signals in two frequency bands, centered at 1575.42 MHz and 1227.6 MHz, denoted as L1 and L2 respectively. These signals include timing patterns relative to the satellite's onboard precision clock (which is kept synchronized by a ground station) as well as a navigation message giving the precise orbital positions of the satellites. GPS receivers process the radio signals, compute ranges to the GPS satellites, and by triangulating these ranges, the GPS receiver determines its position and its internal clock error. Different levels of accuracies can be achieved depending on the techniques deployed. This invention specifically targets the sub-centimeter accuracies achievable on a remote and possibly mobile GPS receiver by processing carrier phase observations both from the remote receiver and from one or more fixed-position reference stations. This procedure is often referred to as Real Time Kinematic or RTK.

To gain a better understanding of the accuracy levels achievable by using the GPS system, it is necessary to understand the two types of signals available from the GPS satellites. The first type of signal includes both the Coarse Acquisition (C/A), which modulates the L1 radio signal and precision (P) code, which modulates both the L1 and L2 radio signals. These are pseudorandom digital codes that provide a known pattern that can be compared to the receiver's version of that pattern. By measuring the time-shift required to align the pseudorandom digital codes, the GPS receiver is able to compute an unambiguous pseudo-range to the satellite. Both the C/A and P codes have a relatively long "wavelength," of about 300 meters (1 microsecond) and 30 meters (0.1 microsecond), respectively. Consequently, use of the C/A code and the P code yield position data only at a relatively coarse level of resolution.

The second type of signal utilized for position determination is the carrier signal. The term "carrier", as used herein, refers to the dominant spectral component which remains in the radio signal after the spectral content caused by the modulated pseudorandom digital codes (C/A and P) is removed. The L1 and L2 carrier signals have wavelengths of about 19 and 24 centimeters, respectively. The GPS receiver is able to "track" these carrier signals, and in doing so, make measurements of the carrier phase to a small fraction of a complete wavelength, permitting range measurement to an accuracy of less than a centimeter.

In stand-alone GPS systems that determine a receiver's position coordinates without reference to a nearby reference receiver, the process of position determination is subject to errors from a number of sources. These include errors in the satellite's clock reference, the location of the orbiting satellite, ionospheric refraction errors (which delay GPS code signals but advance GPS carrier signals), and tropospheric induced delay errors. Prior to May 2, 2002, a large portion of the satellite's clock error, referred to as Selective Availability (SA) was purposefully induced by the U.S. Department of Defense to limit GPS accuracy to non-authorized users. SA would often cause positioning errors exceeding 40 meters, but even today, with SA off, errors caused by the ionosphere can be tens of meters. The above mentioned error sources (satellite clock and satellite position errors, ionosphere refraction, tropospheric delay and SA) are common-mode errors for two receivers that are nearby. That is, the errors caused by these sources are nearly the same for each receiver Another error source, which is present in the carrier phase measurements, is the clock difference between the two receivers. This clock difference applies to all satellite measurements equally, and as such, can be eliminated by what is known as double differencing. This is where one of the satellites is used as a reference and the other satellite measurements are compared to it. This reduces the number of usable satellite measurements by one. As will be explained later, the more measurements available the better the final solution.

To overcome the common-mode errors of the stand-alone GPS system, many kinematic positioning applications make use of multiple GPS receivers. A reference receiver located at a reference site having known coordinates receives the satellite signals simultaneously with the receipt of signals by a remote receiver. Depending on the separation distance, the common-mode errors mentioned above will affect the satellite signals equally for the two receivers. By taking the difference between signals received both at the reference site and at the remote location, common-mode errors are effectively eliminated. This facilitates an accurate determination of the remote receiver's coordinates relative to the reference receiver's coordinates.

The technique of differencing signals is known in the art as differential GPS (DGPS) or differential GNSS (DGNSS). The combination of DGPS with precise measurements of carrier phase leads to position accuracies of less than one centimeter root-mean-squared (centimeter-level positioning). When DGPS/DGNSS positioning utilizing carrier phase is done in real-time while the remote receiver is potentially in motion, it is often referred to as Real-Time Kinematic (RTK) positioning.

One of the difficulties in performing RTK positioning using carrier signals is the existence of an inherent ambiguity that arises because each cycle of the carrier signal looks exactly alike. Therefore, the range measurement based upon carrier phase has an ambiguity equivalent to an integral number of carrier signal wavelengths. Various techniques are used to resolve the ambiguity, which usually involves some form of double-differencing of the carrier measurements. Once ambiguities are solved, however, the receiver continues to apply a constant ambiguity correction to a carrier measurement until loss of lock on that carrier signal or partial loss of lock that results in a carrier cycle slip.

Regardless of the technique deployed, the problem of solving integer ambiguities, in real-time, is always faster and more robust if there are more measurements upon which to discriminate the true integer ambiguities. Robust means that there is less chance of choosing an incorrect set of ambiguities. The degree to which the carrier measurements collectively agree to a common location of the GPS receiver is used as a discriminator in choosing the correct set of ambiguities. The more carrier phase measurements that are available, the more likely it is that the best measure of agreement will correspond to the true (relative to the reference GPS) position of the remote GPS receiver. One method, which effectively gives more measurements, is to use carrier phase measurements on both L1 and L2. The problem though is that it is relatively difficult to track L2 because it is modulated only by P code and the United States Department of Defense has limited access to P code modulation by encrypting the P code prior to transmission. Some receivers are capable of applying various cross-correlation techniques to track the P code on L2, but these are usually more expensive receivers than L1 only capable receivers.

Other approaches have been employed to gain additional measurements on GPS receivers utilizing additional satellites and other types of satellite systems such as the GLONASS system, pseudolites, or Low Earth Orbit (LEO) satellite signals in an attempt to enhance RTK. Nevertheless, it is often desired to perform RTK on low-cost L1 only receivers that do not have access to the GLONASS system, pseudolites, or LEO satellite signals.

SUMMARY OF THE INVENTION

Disclosed herein in an exemplary embodiment is a method for measuring relative position of fixed or slow-moving points in close proximity comprising: receiving a set of satellite signals with a first receiver corresponding to a first position; receiving a related set of satellite signals with a second receiver corresponding to a second position; and computing a position of the second position based on at least one of code phase and carrier phase differencing techniques. At least one of: a clock used in the first receiver and a clock used in the second receiver are synchronized to eliminate substantial clock variation between the first receiver and the second receiver; and the first receiver and the second receiver share a common clock.

Also disclosed herein in another exemplary embodiment is a system for measuring relative position of fixed or slow-moving points in close proximity comprising: a first receiver in operable communication with a first antenna configured to receive a first plurality of satellite signals at a first position; and a second receiver in operable communication with a second antenna configured to receive a second plurality of satellite signals at a second position; and at least one of the first receiver and the second receiver computing a position corresponding to a position of the second antenna based on at least one of code phase and carrier phase differencing techniques. At least one of: a clock used in the first receiver and a clock used in the second receiver are synchronized to eliminate clock variation between the first receiver and the second receiver, and the first receiver and the second receiver share a common clock.

Further, disclosed herein in yet another exemplary embodiment is a system for measuring relative position of fixed or slow-moving points in close proximity comprising: a means for receiving a set of satellite signals with a first receiver corresponding to a first position; a means for receiving a related set of satellite signals with a second receiver corresponding to a second position; and a means for computing a position of the second position based on at least one of code phase and carrier phase differencing techniques. At least one of: a clock used in the first receiver and a clock used in the second receiver are synchronized to eliminate clock variation between the first receiver and the second receiver, and the first receiver and the second receiver share a common clock.

Also disclosed herein in yet another exemplary embodiment is a storage medium encoded with a machine-readable computer program code, the code including instructions for causing a computer to implement the abovementioned method for measuring relative position of fixed or slow-moving points in close proximity.

Further disclosed herein in yet another exemplary embodiment is a computer data signal, the computer data signal comprising code configured to cause a processor to implement the abovementioned method for measuring relative position of fixed or slow-moving points in close proximity. Still further, applications are disclosed for the system and method using L1 receivers and RTK. Additional aspects and applications include a localized RTK.surveying system and method and a digital tape measure.

BRIEF DESCRIPTION OF THE DRAWINGS

Referring now to the drawings wherein like elements are numbered alike in the several figures:

FIG. 1A is a diagram of a system embodying an alternative aspect of the invention and including separate master and slave receivers;

FIGS. 5-10 show a positioning system comprising another aspect of the invention, which is adapted for use in connection with localized RTK surveying for GIS procedures and 3-D measuring with a "digital tape measure" configuration of the invention.

DETAILED DESCRIPTION OF PREFERRED ASPECTS OF THE INVENTION

Figure 1:
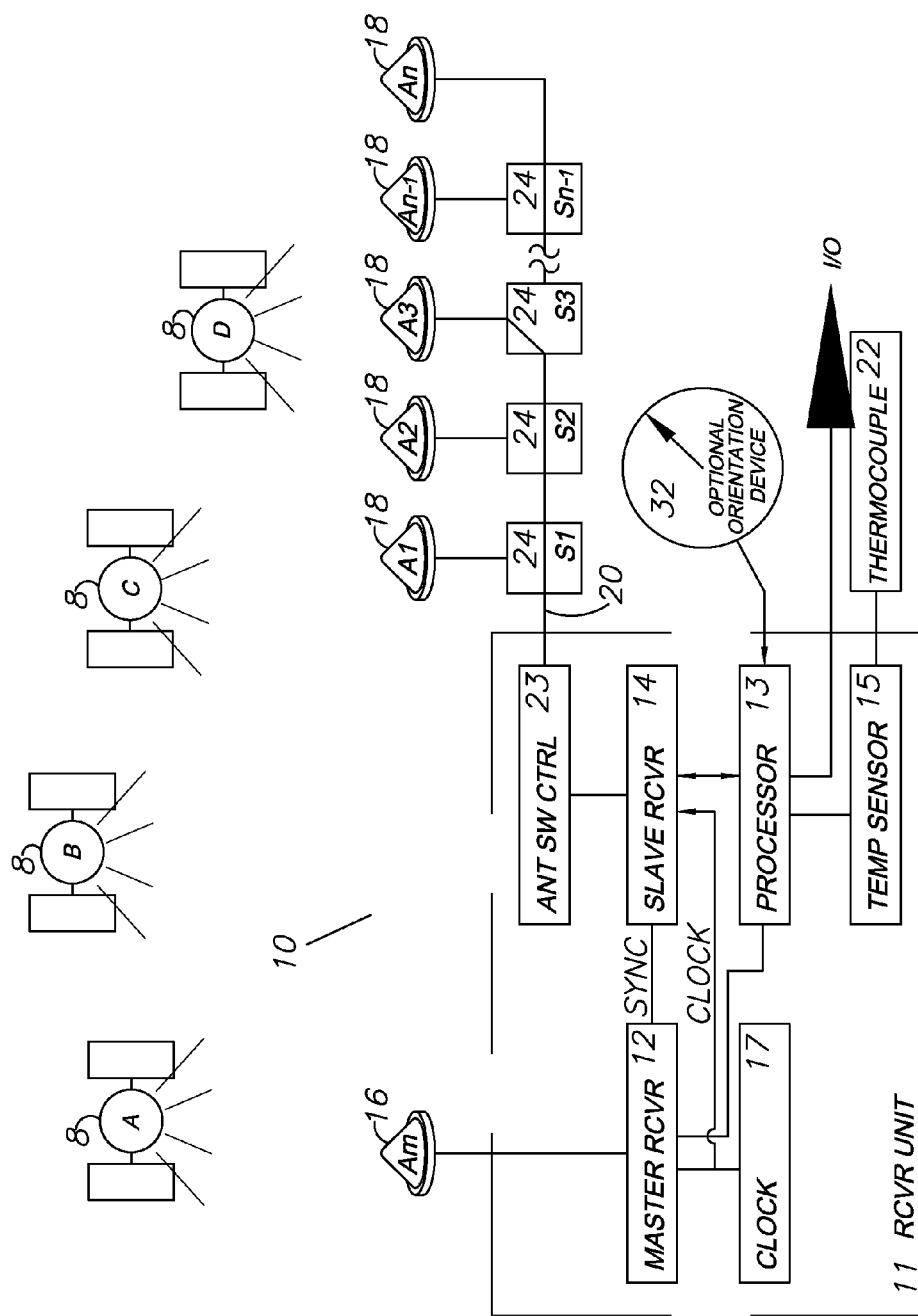
FIG. 1 is a diagram of a system embodying an aspect of the invention and including combined master and slave receivers.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof. Global navigation satellite systems (GNSS) are broadly defined to include the global positioning system (GPS, U.S.), Galileo (proposed), GLONASS (Russia), Beidou (China), Compass (proposed), the Indian Regional Navigational Satellite System (IRNSS), QZSS (Japan, proposed) and other current and future positioning technology using signals from satellites, with or without augmentation from terrestrial sources. Inertial navigation systems (INS) include gyroscopic (gyro) sensors, accelerometers and similar technologies for providing output corresponding to the inertia of moving components in all axes, i.e. through six degrees of freedom (positive and negative directions along transverse X, longitudinal Y and vertical Z axes). Yaw, pitch and roll refer to moving component rotation about the Z, X and Y axes respectively. Said terminology will include the words specifically mentioned, derivatives thereof and words of similar meaning.

In a first alternative embodiment, this invention includes two receivers, which either share the same clock, or have a clock synchronization technique to eliminate the receiver clock errors. The reference receiver (herein called the master or base) is connected to a single antenna whereas the slave receiver, which is clock synchronized with the master, has a multitude of antennas connected to it, which are switched in and out to take a measurement at each antenna location.

The GPS slave (e.g., rover) receiver computes the location vector from a double or single difference of the GPS rover and reference carrier phases for a plurality of GNSS satellites. As the receivers are either co-located or have a link, the raw measurements from the slave antennas are sent to the master for computation (of course any receiver or even a separate computer could perform this computation). This eliminates the need for a radio link between the master and slave receivers as is required in prior art RTK.

According to a more specific aspect of the present invention, in order to solve the integer ambiguity problem, the master selects the slave antenna to be measured based on the GPS satellite almanac to provide the best geometry (or one of the best) and based on its time slot. The master also has the slave antenna's position stored to provide an immediate calculation of the carrier cycle ambiguity to each satellite. Position calculation then follows conventional RTK GPS practice of using single or double difference equations involving the total phase distance to each satellite to solve the relative location of the slave antenna with respect to the master antenna. As previously described, there is no clock difference between the two receivers (or the clock difference is known and nearly constant) so double differencing may not be required. There may however be a significant delay through the coaxial cable to each slave antenna. This also can be stored and the delay removed to the measurements. A temperature drift may be noticed which will gradually change the delay, but this too can be eliminated by the addition of a thermocouple to determine the ambient temperature around the cable and antennas. By doing this, all satellite measurements may be used in the solution.

Another advantage of eliminating double differencing is that ambiguity search routines will not have to form linear combinations to decorrelate the measurement data. When it is possible to use single differences, they are generally preferred over double difference equations. The double difference cross-correlations are more difficult to deal with mathematically, say in a measurement covariance matrix of a Kalman filter. Single difference equations result in a measurement covariance matrix having zero cross correlation. However, accuracy can be achieved with both approaches.

Referring now to FIG. 1, a simplified block diagram of a GNSS positioning system 10 embodying an aspect of the present invention is depicted. In an exemplary embodiment, a method and system use two receivers, which either share the same clock, or include a clock synchronization technique to eliminate a receiver clock. Further, the reference receiver (hereinafter also called the master or base receiver) 12 is connected to a master antenna 16 (Am), whereas the rover or slave receiver 14, which is clock synchronized with the master receiver 12, has a multitude of antennas 18 (A1-An) connected to it, which are switched in and out to take a measurement at each antenna location. As shown in FIG. 1, the master receiver 12 and the slave receiver 14 are combined in a single receiver unit 11 on a common printed circuit board (PCB), which also includes a central processing unit (CPU) 13, a temperature sensor 15, a clock 17 and an antenna switch control 23. Collocating the receivers 12, 14 facilitates communication between them. It will be appreciated that while an exemplary embodiment is described and illustrated with respect to measuring movement of a dam, dike or beam, the disclosed invention is readily applicable to other applications where fixed or slow moving phenomena are tracked. Such applications may include roadways, bridges, building motion, glacier and iceberg travels and the like. It is also applicable to conventional RTK applications that require relatively short distances between master and slave receivers and where it is desirable to take advantage of a common clock for added robustness and the elimination of a radio for cost and robustness. For example, one application is local surveying or measuring distance at a construction site, or leveling (such as required for foundation placement) at that site.

The master and slave receivers 12, 14 are configured to either share the same clock 17, or include a clock synchronization system (SYNC connection). This technique facilitates elimination of the receiver clock errors. The CPU 13 computes a location vector based on a double or single difference of the GNSS code and/or carrier phases for the master receiver 12, the slave receiver 14 and a plurality of GPS satellites 8. As the master and slave receivers 12 and 14 are either co-located or have a link, the raw measurements from the slave antennas are sent to the CPU 13 for computation (of course any receiver or even a separate computer could perform this computation). This eliminates the need for a radio link between the master and slave receivers 12, 14 as is required in existing RTK applications. Moreover, in another exemplary embodiment, satellite signals from multiple antennas with a known dimensional separation may be combined to achieve receiving an optimal set of satellite 8 signals for a given location. Such an approach will be beneficial for instances when insufficient data is available from a single antenna or a less desirable set of satellite 8 signals is all that is available. In this way, a location may still be computed despite poor satellite 8 geometry, obstructions, and the like.

Advantageously, in an exemplary embodiment, rather than increasing the number of measurements, a reduction in the number of unknowns is achieved by eliminating the clock errors between the reference receiver 12 and the rover 14 (or master and slave). This approach yields an even greater advantage than adding measurements, unless a substantial number of measurements could readily be added. In addition, an exemplary embodiment as disclosed herein significantly improves the ability to calculate the integer ambiguities to each satellite 8. It will be appreciated that because the slave antennas 18 are presumed to move far less than a fraction of a carrier cycle (e.g., 19 cm) between measurements, the positions of each slave antenna 18 location may be stored and then later retrieved as needed to facilitate the immediate calculation of the integer ambiguities.

In order to solve the integer ambiguity problem with current RTK applications, the master receiver 12 selects a particular slave antenna 18 to be measured based on the GPS satellite almanac to provide the best geometry (or one of the best) and based on its time slot. The master receiver 12 also has the slave antenna's position stored (as stated above) to provide an immediate calculation of the carrier cycle ambiguity to each satellite 8. Position calculation then follows RTK GNSS practice of using single or double difference equations involving the total phase distance to each satellite 8 to solve the relative location of slave antenna 18 with respect to the master antenna 16. One such methodology for GNSS positioning employing RTK is taught by Whitehead, U.S. Pat. No. 6,469,663 the contents of which are incorporated by reference herein in their entirety. As previously described, there is no clock difference between the two receivers 12 and 14 (or the clock difference is known and nearly constant) so double differencing may not be required. It will however, be readily appreciated that there may be a significant delay through a coaxial cable 20 to each slave antenna 18. This delay is dependent upon the selected position for each antenna relative to the master (e.g., the length of cable 20 to reach each antenna 18). Advantageously, the delay may readily be measured and stored and the delay mathematically removed to correct the measurements. Moreover, selected antennas 18 may exhibit a temperature drift that may result in a gradual change of the expected delay. However, advantageously, this too may be readily eliminated by the addition of a temperature sensor 15 connected to a thermocouple 22 to determine the ambient temperature around the cable 20 and the antennas 16 and 18. Advantageously, by employing the abovementioned correction and compensation schemes, all satellite 8 measurements may be used to formulate the solution.

Another advantage of eliminating double differencing is that ambiguity search routines will not have to form linear combinations to decorrelate the measurement data. When it is possible to use single differences, they are generally preferred over double difference equations. The double difference cross-correlations are more difficult to deal with mathematically, say in a measurement covariance matrix of a Kalman filter. Single difference equations result in a measurement covariance matrix with zero cross-correlation, which facilitates computation of the ambiguities. The accuracy of both approaches should be substantially similar. However, single differencing is an easier process.

Yet another exemplary embodiment as an enhancement to the abovementioned embodiments uses the capability to take advantage of the slow dynamics of antenna motion by averaging over periods of time, thereby reducing multipath contributions (which are time varying) and poor satellite 8 geometries. In fact, it will be appreciated that the master receiver 12 is constantly tracking the satellites 8 and may further be employed to select the best time of day, e.g., the best constellation (the GNSS satellites 8 orbit in a 12 hour cycle), to perform the measurements based on its knowledge of the slave antennas' 18 positions and the satellites currently visible. Additionally the master receiver 12 may select two separate times of day to provide two independent satellite position constellations for performing the measurements. This would reduce the amount of averaging time required, yet still provide the multipath and poor satellite geometry reduction benefits. Overall, such an approach may be employed to reduce power consumption requirements as the receiver 12 would not have to be averaging continuously for a twelve hour period. Power consumption reduction can be beneficial, especially at remote sites.

Referring once again to FIG. 1, the system 10 is shown configured with a plurality of slave antennas 18 (also denoted as A1, A2 . . . An) connected to the slave receiver 14. Each slave antenna 18 is switched (except the last one which is selected when all switches are connected through to it) with a switch box 24 (also denoted as S1, S2 . . . ). The switch(es) 24 are activated and the antennas 18 selected by an antenna switch controller 23, which can be incorporated on the receiver unit 11. The antenna switch controller 23 can send a tone or some other control signal 30 on the cable 20 to activate a particular desired switch 24 and thereby activate the slave antenna 18 connected thereto. It will be appreciated that in order to provide fault protection, the switch(es) 24 may be designed and configured so that in the event a switch 24 fails, the connection through to the next switch 24 is made. Advantageously, in this way, if one switch 24 should fail, it will still permit measurements on the remaining slave antennas 18. Smart reset circuitry can be employed to insure that the master receiver 12 and the slave receiver 14 will start up at the same instant and therefore the samples will be aligned as well. This approach substantially eliminates any receiver clock biases.

As mentioned previously, phase drift and delay can result from the coaxial cables 20, which may be removed and/or compensated by using a temperature sensor 15 connected to a thermocouple 22 to measure the temperature. A look-up table may be employed by the CPU 13 that has stored (alternatively a simple formula may be used to save memory) phase delay difference versus ambient temperature. An alternative embodiment could use equivalent coaxial cable 20 lengths to all antennas 16, 18 so that any temperature or other loss and drift effects would be matched and therefore cancelled in the single difference calculation.

Normally in order to solve for integer ambiguities from GNSS satellite 8 signals, double differencing is used to bring forth the integer nature of the ambiguities by removing other non-integer sources of error such as clock and atmospheric delays from the measurements. To illustrate, consider four equations describing pseudo-ranges resulting from measurements of carrier phase on receivers denoted m and n for the slave and master, respectively:

$$\phi_m^i = R_m^i + \tau sv^i + A^i + B_m + N_m^i$$

$$\phi_n^i = R_n^i + \tau sv^i = A^i + B_n + N_n^i$$

$$\phi_m^k = R_m^k + \tau sv^k = Ak + B_m + N_m^k$$

$$\phi_n^k = R_n^k + \tau sv^k = A^k + Bn + N_n^k$$

Here $\phi_m^i$ is the measured pseudorange from rover receiver m to satellite i, $\phi_n^i$ is the measured pseudorange from reference receiver n to satellite i, $\phi_m^k$ is the measured pseudorange from rover receiver m to satellite k, and $\phi_n^k$ is the measured pseudorange from reference receiver n to satellite k. Each pseudorange is actually a measure of the summation a number of different physical quantities all of which shall be expressed in units of carrier cycles at L1 (roughly 19 cm).

Specifically, in the first of these equations, the term $R_m^i$ is the true geometric range from receiver m to satellite i, $\tau sv^i$ is the clock error of satellite i, $A^i$ is the atmospheric delays, which are associated with satellite i, $B_m$ is the clock error of receiver m, and $N_m^i$ is the integer ambiguity in the range measurement from receiver m to satellite i. Similar notation applies to the remaining three equations. For simplicity, these equations do not show noise effects such as errors caused by receiver thermal noise or multipath noise.

Consider first applying the single difference. If the first two equations are differenced:

$$\phi_m^i - \phi_n^i = R_m^i - R_n^i + B_m - B_n + N_m^i - N_n^i$$

Similarly, differencing the second two equations yields:

$$\phi_m^k - \phi_n^k = R_m^k - R_n^k + B_m - B_n + N_m^k - N_n^k$$

The satellite common errors, such as satellite clock, .tau.s-v.sup.i and atmosphere, A.sup.i (atmosphere is common if we assume relative close proximity of receivers m and n) are removed in the single difference. As the clock errors B.sub.m are common these term will also cancel out, leaving:

$$\phi_m^i - \phi_n^i = R_m^i - R_n^i + N_m^i$$

Since the ambiguities are all integers that can be lumped together into a single term, it may be written:

$$\phi_m^i - \phi_n^i = R_m^i - R_n^i + N_{mn}$$

where $$N_{mn} = N_m^i N_n^i$$

This shows that single differencing the pseudorange measurements removes common atmospheric errors from the equations while leaving simple combinations of the geometric ranges and integer ambiguities, and clock errors drop out due to the synchronization of the two receivers. For N satellites in common view of the master (reference) and slave (remote) receivers 12 and 14 respectively, there are N such single-difference equations that can be formed without causing mathematical redundancy. Whereas double differencing, to eliminate clock biases in receivers, which are not clock synchronous, results in only N−1 equations. This gives rise to N unknown integer ambiguities that must be solved in addition to the 3 unknown coordinates (X,Y,Z) of the GPS receiver. Note that each geometric range term, for example R.sub.m.sup.i, is a function only of the receiver's position and the transmitting satellite's position. Specifically:

$$R_m^i = \sqrt{(Xrecv_m - Xsat^i)^2 + (Yrecv_m - Ysat^i)^2 + (Zrecv_m - Zsat^1)^2}$$

where $Xrecv_m$, $Yrecv_m$, $Zrecv_m$ are the Cartesian coordinates of the receiver m at the time reception of the signal from satellite i, whose coordinates are $Xsat^i$, $Ysat^i$, $Zsat^i$ at the time of signal transmission. In the problem at hand, only the selected slave's antenna's 18 position is unknown. Once the ambiguities are determined, only the selected antenna's 3-coordinates of position are unknown and these are easily solved using a mathematical approach such as Least Squares.

Every time a new slave antenna 18 is selected, the integer ambiguities must be solved. This is a complex process and can be very time consuming if the position is unknown. However, in this instance, it will be appreciated that the movements to be measured are on the order of less than a quarter of a wavelength (5 cm) between measurements. This limitation permits a rapid calculation of the integer ambiguities since the master receiver 12 or the CPU 13 "knows" the satellite's position and the selected antenna's position well enough to directly calculate ambiguities. Such an approach will greatly reduce the time utilized to solve for the integer from up to 10 minutes to a second or less. Cycle slips, which result usually from motion which the receiver failed to track properly and therefore slipped from one ambiguity to another is also greatly reduced due to the very low dynamics of the selected antenna location. An added benefit of the low dynamics is the receiver can integrate the measurements over a long period of time and narrow the carrier tracking loop bandwidth to reduce noise.

As mentioned previously, it should be appreciated that another source of error in applying RTK positioning, especially when solving for integer ambiguities over long baselines, is non-common atmospheric propagation delays on the signals received by the slave (rover) 14 and master (reference) receivers 12. Since differencing cannot eliminate these non-common delays, the next best alternative is to estimate or model their effects. However, in an exemplary RTK embodiment, the slave antennas 18 and the master antenna 16 will most likely be within 5 kilometers of each other and at this distance the atmospheric effects are minimal and may readily be ignored. An orientation device 32, such as a compass or some other non-GNSS orientation device, can be affixed to a structure of interest to determine its attitude or orientation and to provide a corresponding signal to the CPU 13 for processing in connection with GNSS ranging data received via the receivers 12, 14.

A further advantage of this technique is that it permits a carrier phase based solution even when a large portion of the sky, and therefore the visible satellites, are obscured by a wall, dam (FIG. 2) or other structure. This is because, as described above, the receivers 12, 14 will still have one more measurement than previously due to the utilization of single differencing rather than double differencing techniques. In addition, the fixed or very slow moving nature of the problem permits long-term measurements.

FIG. 1A shows a GNSS positioning system 40 comprising an alternative aspect of the present invention with a master receiver unit 42 and a separate slave receiver unit 44, which can be connected by a clock-synchronizing connection (SYNC) 46 of the receivers 12, 14, a clock-sharing connection 48 and a link 50, which can comprise a cable or an RF connection between suitable transmitters and receivers. An optional orientation device 32 can be connected to either or both of the receiver units 42, 44, e.g., to the CPU 13 and/or an optional CPU 52 of the slave unit 42. Optionally, the slave unit 44 can include a clock 54, which can be synchronized with the master receiver unit clock 17. The slave receiver 14 is connected to a slave antenna array, which can comprise a single antenna or a multiple-antenna array as shown in FIG. 1.

Figure 2:
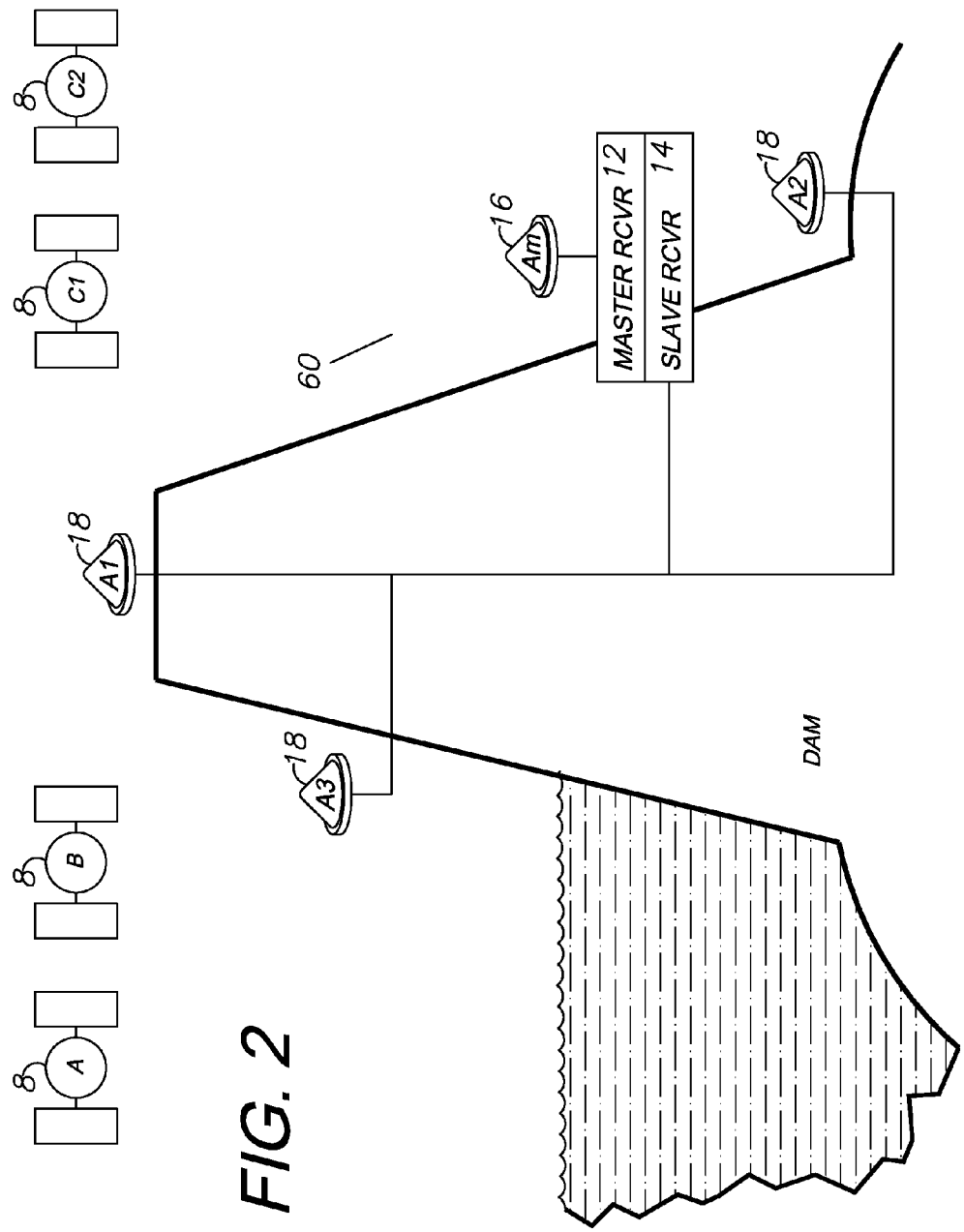
FIG. 2 is a vertical, cross-sectional view of an application of the invention, shown in connection with a dam for monitoring the locations of various points thereon.

Referring now to FIG. 2, in a GNSS dam-monitoring positioning system 60 comprising yet another exemplary embodiment, a technique is employed to utilize and take advantage of the master receiver's 12 knowledge of the satellites' locations in the sky, and a preprogrammed knowledge of the visibility of the sky for selected slave antennas 18. For example, FIG. 2 shows a configuration of satellites 8 and slave antennas 18 whereby the slave antenna A1 receives ranging data transmissions from all four satellites (SAT 1-4), but slave antenna A2 only receives transmissions from satellites SAT 2-4 and slave antenna A3 only receives transmissions from satellite SAT 1.

The master receiver 12 and/or the CPU 13 may then choose the best time, that is, the time with the most satellites visible to the selected slave antenna 18, to perform the measurement at that location. The receiver(s) can then dwell for some time (say one half hour) to integrate and reduce noise, then move on to another slave antenna 18. Moreover, it will be appreciated that the master receiver 12 and/or the CPU 13 may direct that the slave receiver 14 return to the same location after some duration, e.g. a few hours, when another optimal/desirable geometry is available, which is uncorrelated to the first. By taking measurements at two (or more) different times (and geometries), and averaging the two (or more) measurements, multipath and atmospheric induced errors, typically correlated over time, will be reduced. This method will allow monitoring of the face of a dam or berm, or even a valley wall.

Further assumptions may be made of the anticipated motion of the monitoring point at the selected slave antenna 18 to further reduce the number of measurements required. For example, the motion is of a dam is generally horizontally away from the pressure excerpted by the body of water behind it. By performing the calculation only in this direction, a single satellite may be enough to perform a measurement. This is obvious when looking at this equation:

$$R_m^{i=\sqrt{\phantom{x}}} \sqrt{(Xrecv_m - Xsat^i)^2 + (Yrecv_m - Ysat^i)^2 + (Zrecv_m - Zsat^1)^2}$$

As explained previously the satellite position (Xsat, Ysat and Zsat) are known, and if the receiver assumes there is minimal motion in Y and Z, then there is only one unknown left. Of course, additional satellites are highly desired to reduce noise and errors and to help detect any false or erroneous readings from throwing the solution off.

Another area of concern for running a long length of coaxial cable 20 to the antennas 16, 18, other than phase delay, which was addressed earlier, is attenuation. In yet another exemplary embodiment, the slave antennas 18 may be configured as active antennas, e.g., antennas that include an internal Low Noise Amplifier (LNA). In a receiver design, the noise figure is often important, and comprises a combination of the noise temperature before the first LNA, the LNA noise figure and subsequent losses divided by the LNA gain. Subsequent amplifier gains will reduce following noise temperature (T) contributions by their gain as is shown in the equation below:

$$Tt = T(pre\ LNA) + T(LNA) + T(lna2)/(CL \cdot \text{times} \cdot Glna1) +$$
$$T(lna3)/(CL \cdot \text{times} \cdot Glna1 \cdot \text{times} \cdot Glna2) +$$
$$T(lna4)/(CL \cdot \text{times} \cdot Glna1 \cdot \text{times} \cdot Glna2 \cdot \text{times} \cdot Glna3)\ \text{etc.}$$

where: CL refers to cable losses in linear terms, that is −10 dB is 0.1,

Glnan refers to gain of LNAn in linear terms so a gain of 20 dB is 100,

T(LNAn) refers to the noise temperature in Kelvin of stage n.

Noise Figure (F) is related to noise temperature by:

$$F\ (\text{dB}) = 10.\text{times}.\text{LOG}((1+T)/Tamb)$$

Where Tamb refers to the reference temperature, typically 290 K (20 Celsius).

As an example, a typical low loss coaxial cable (RG6 type) has 20 dB (CL=0.01) of attenuation every 100 meters. The noise temperature of the antenna and LNA is 170 K (2 dB noise figure), the gain of the first LNA is 30 dB (or 1000). Subsequent LNA's have the same noise temperature and a gain of 12 dB (15.8). If each antenna is 50 meters apart the losses are −10 dB. After five stages the noise temperature of the system is:

$$T5=T1+T2/(CL1 \times G1)+T3/(CL1 \times C12 \times G1 \times G2)+T4/$$
$$(CL1 \times CL2 \times C13 \times G1 \times G2 \times G3)+T5/(CL1 \times C12 \times$$
$$C13 \times C14 \times G1 \times G2 \times G3 \times G4)$$

$$T5=190+190/100+190/158+190/250+190/395$$

$$T5=194\ K$$

$$F5=2.22\ \text{dB}$$

This is compared to the first stage, which would have a noise figure of 2 dB. A GPS receiver such as the master receiver 12, or slave receiver 14 can operate with a noise figure of up to 3.5 dB without suffering significant degradation. As can be seen, additional stages will have diminishing contributions. The total gain will be increasing by only 2 dB each step, so after 1 km, in this example, the maximum gain will be 68 dB, the gain of the first stage is 30 dB, the Automatic Gain Control of the receiver can remove this difference easily. Also after 20 stages (1 km) the total noise temperature in this example would be T(1 km)=194.7 K, an insignificant increase.

Figure 3:
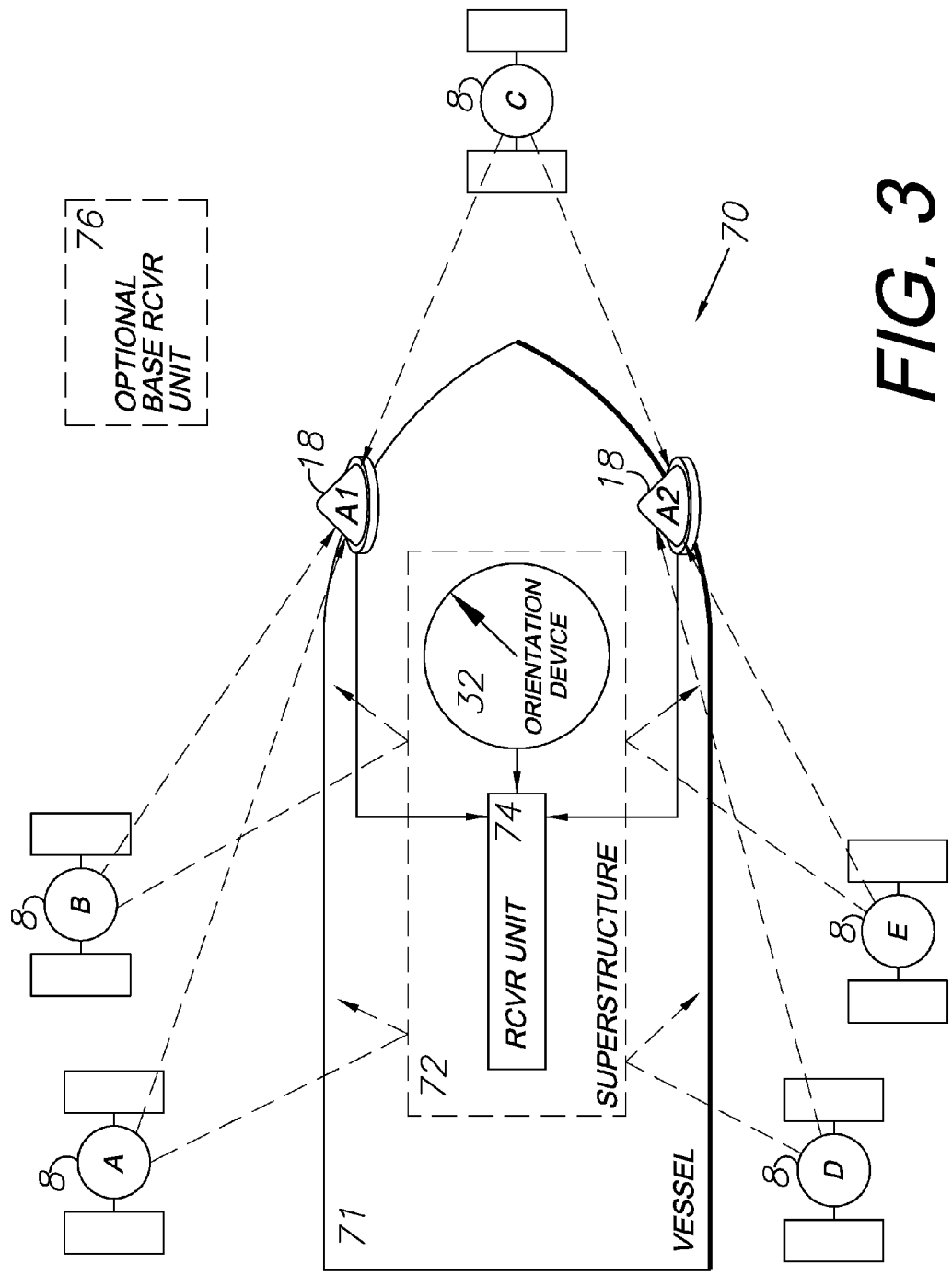
FIG. 3 is top plan view of another application of the invention, shown in connection with a marine vessel.

Further, in a marine vessel (e.g., barge) 71 positioning system 70 comprising another exemplary embodiment shown in FIG. 3, multiple antennas 18 (A1, A2) could be used to compute a solution of a single point on a rigid body to which they are attached, using known geometry and distances. Such an approach may be employed, for example, when not any one antenna 18 provides enough useful information (satellites 8) to compute a location solution due to obstructions, e.g., a superstructure 72, but the constellation of satellites 8 could provide sufficient positioning data. In other words, the superstructure 72 partially blocks the antennas 16 (A1) and 18 (A2) from views of satellites 8 whereby each antenna 16, 18 receives GNSS positioning signals from some, but not all, of the satellite 8 constellation. It will be appreciated that the antennas 16, 18 are positioned in a predetermined, known relation (i.e. spacing and orientation) for determining attitude comprising yaw and roll, although the primary concern would be yaw because the antennas 16, 18 would normally remain at a relatively constant level in a marine application. The antennas 16, 18 are connected to a receiver unit 74, which can be similar to the receiver units described above.

Advantageously, a position solution employing this approach would not necessarily have to utilize carrier-phase based differencing (it could be code phase). An application might include positioning on a marine vessel 71, such as a barge, where the location of a reference point is needed but there are cranes, towers and/or a superstructure 72 blocking the satellite view so that there is not one optimum GNSS location. However, by placing an antenna 18 on either side of the barge 71, enough satellites 8 could be tracked by the combined antenna 16, 18 arrangement that a solution of the location of some reference point on the barge 71 could still be obtained. Furthermore, on a barge 71, the orientation device 32, such as a compass, could also be used to give orientation, thus removing another unknown from the relative location of two receivers (e.g., 12, 14 in the receiver unit 74) rather than solving a relative location of one receiver with respect to the other by using the combined receivers 12, 14 to produce one non-relative location. The system shown in FIG. 3 can also include an optional base unit 76 for RTK applications. A position solution microprocessor (CPU) can be provided in the receiver unit 74 for calculating position solutions.

Figure 4:
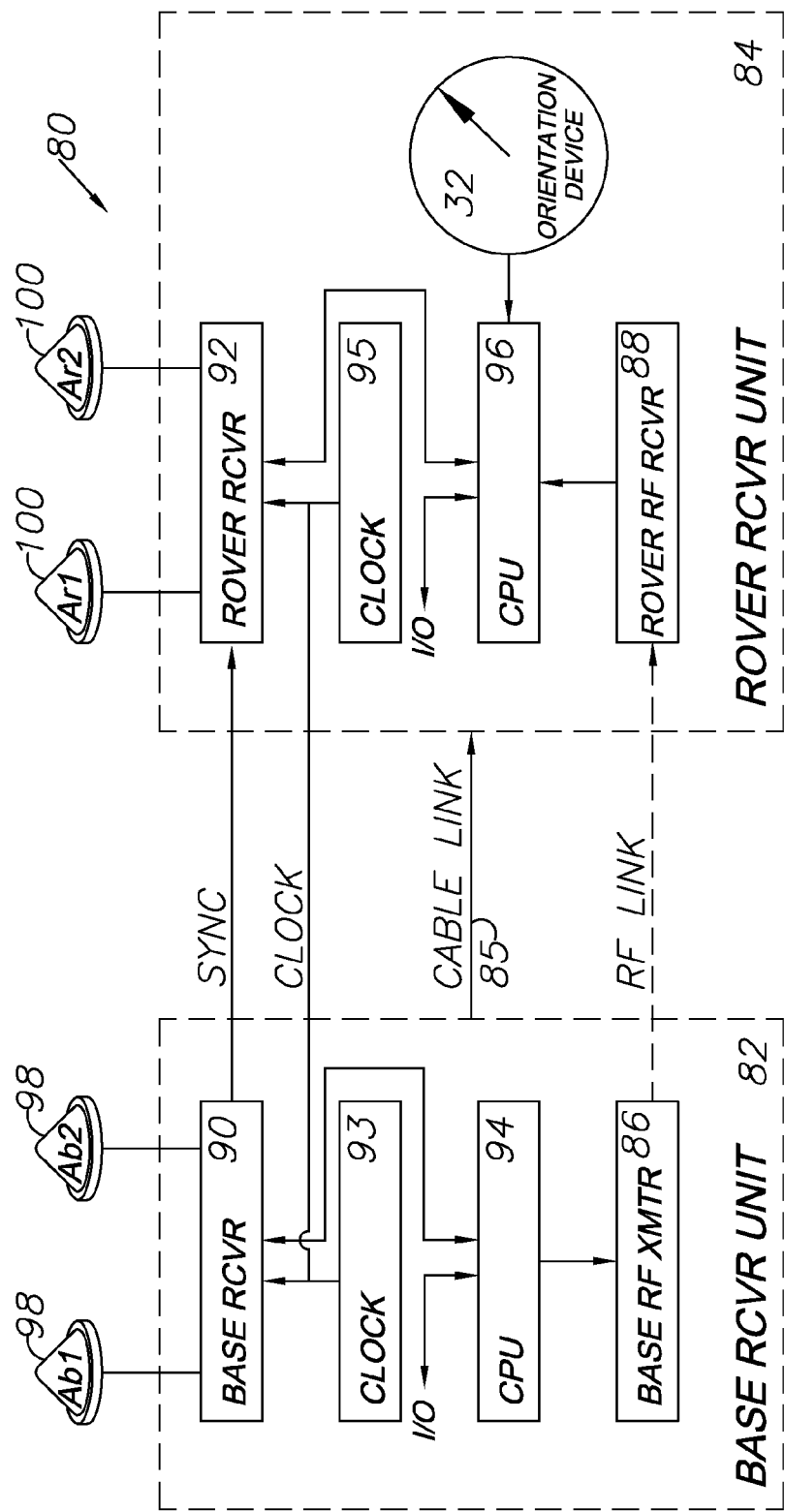
FIG. 4 is a diagram of a real-time kinematic (RTK) system embodying another aspect of the present invention and using single frequency (L1) receivers.
Figure 5:
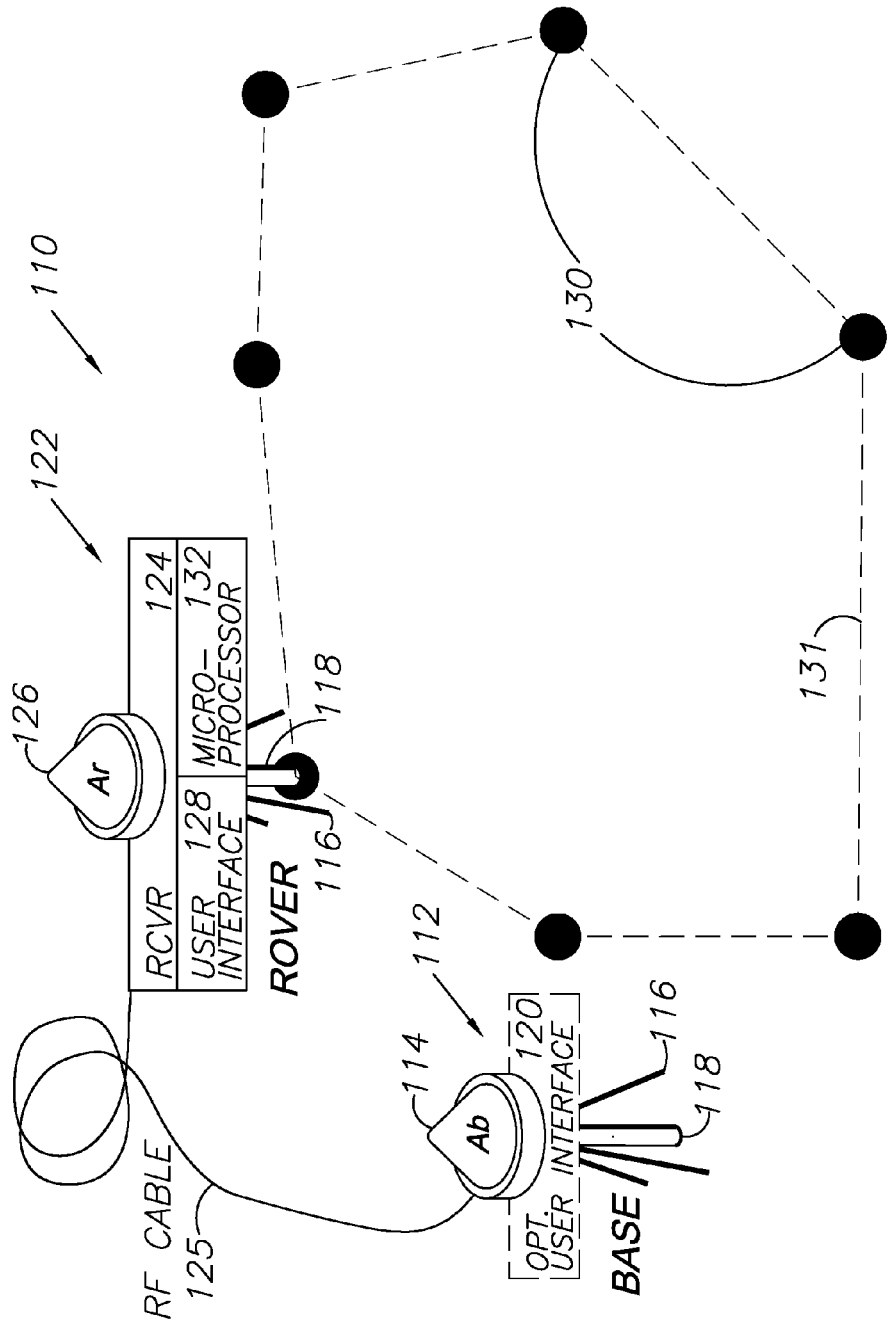

FIG. 4 shows a GNSS positioning system 80 comprising another alternative aspect of the present invention, with a base receiver unit 82 and a rover receiver unit 84, which can be configured similarly to the master and slave receiver units 42, 44 described above. The base and rover receiver units 82, 84 include base and rover GNSS receivers 90, 92, clocks 93, 95 and CPUs 94, 96 respectively. The base and rover receiver units 82, 84 can be connected by a cable link 85 for relatively close operation, such as surveying. Alternatively, the base and rover receiver units 82, 84 can be wirelessly connected via a base RF transmitter 86 and a rover RF receiver 88. An optional orientation device 32 can be connected to the rover CPU 92 for providing orientation and attitude information with respect to a rover vehicle or piece of equipment.

The receivers 90, 92 can comprise L1-only receivers, which tend to be less expensive than the more sophisticated dual frequency (L1/L2) receivers, which are commonly used for RTK fine positioning. The base receiver unit 82 is preferably equipped with a single base antenna 98 and the rover receiver unit 84 is preferably equipped with at least two rover antennas 100. Although the base receiver unit 82 could be equipped with multiple antennas (e.g., for reducing multipath errors) and the rover receiver unit 84 could be equipped with a single antenna, the normal preferred configuration includes multiple rover antennas 100 (Ar1, Ar2, . . . Arn) whereby the attitude (orientation) of the rover can be determined using GNSS ranging techniques. Attitude/orientation of the base is not generally needed for rover positioning.

The rover attitude information facilitates resolving integer ambiguities in GNSS positioning solutions by first solving for locations of the rover antennas 100 with respect to each other (an attitude solution). Next, using the known rover antenna relative locations, and nonrelative ambiguities, the system 80 solves for the global ambiguities using observations taken at each antenna 98, 100. The number of observations is thereby significantly increased over conventional RTK systems. The global ambiguities are the ambiguities of one rover antenna 100 that allow it be located in a global sense, i.e. relative to the base receiver unit 82.

The steps of the GNSS positioning method using the system 80 comprise:
1. Transmit code and carrier phase data from a base station to a multiple-antenna rover system, such as would be done in a conventional RTK system that uses only one rover antenna.
2. At the rover side, determine the relative locations and relative ambiguities of the multiple antennas using an attitude solution that takes advantage of known constraints in geometry or clock as described in U.S. Pat. No. 7,388,539, which is incorporated herein by reference. The attitude solution is usually done much quicker than conventional RTK ambiguity resolution due to the use of geometry constraints and/or a common clock.
3. Optionally store off the attitude solution (locations and ambiguities) in step 2 for later retrieval so that the data can be time-tag matched with the data from the base station. Also store off the current GPS observations (carrier phase) for the same purpose. This step is not necessary, but time tag matching of base and rover data improves results by avoiding extrapolation errors (not so critical with selective availability (SA) off, except for possibly on the Wide-Area Augmentation System (WAAS) satellites which have been observed to have high phase jitter).
4. Form single or double difference equations and solve for the global ambiguities using knowledge of relative antenna locations/clocks and relative ambiguities.

An example is provided below

Example Using the Two Antenna Rover System 80

At antenna one (1) of the rover, we can write the equation:

$$R1=[A]x1-N1,$$

Where R1 is a carrier phase observation vector (single or double difference) at antenna (1), A is a design matrix, X1 is the location vector of antenna 1 (may include clock if single differencing is used), and N1 is an ambiguity vector for antenna (1).

Similarly, at antenna two (2) we can write:

$$R2=[A]x2-N2,$$

Where R2 is a carrier phase observation vector at antenna (1), A is a design matrix, X2 is the location vector of antenna 2, and N2 is an ambiguity vector for antenna (2).

Not, that in this example, the design matrix A is taken to be the same in both antenna equations. But, this is true only if both antennas see the same satellites. A more general example would use separate A1 and A2 for the two equations.

Solving an attitude solution (see U.S. Pat. No. 7,388,539), we find the relative antenna displacement V, and the relative ambiguity M where:

$$V=x2-x1$$

And $$M=N2-N1$$

Thus, combining the above equations, we have:

$$R1=[A]x1-N1$$

$$R2=[A](x1+V)-(N1+M)$$

Re-arranging gives:

$$R1=[A]x1-N1$$

$$R2-[A]V+M=[A]x1-N1$$

And, combining into a single vector equation gives:

$$R=[A]x1-N$$

Where $$R=[R1,R2-[A]\ V+M]^T \text{ and } N=[N1,\ N1]^T$$

Where 'T' denotes transpose

Compared to conventional RTK techniques, the method described above provides twice as many equations (for a rover with two antennas 100) for the same number of unknowns x1 and N1. N1 is referred to as the global ambiguity, which is easier to solve for with more equations. For example, see Whitehead U.S. Pat. No. 6,469,663 for Method and System for GPS and WAAS Carrier Phase Measurements for Relative Positioning, which is incorporated herein by reference.

FIGS. 5-10 show a localized RTK positioning system 110 comprising another aspect of the invention. The system 110 includes a base (which can also be designated a master, reference or datum) 112 including a base antenna 114 (Ab). The base 112 is adapted for placement at fixed locations, e.g., on a tripod 116, for localized surveying applications. A marking or locating device 118 is centrally located under the base antenna 114 and is adapted for placing a pin, paint mark, stake, benchmark or other suitable point-identifying device at a precise point, which can henceforth serve as a reference location. Of course, the reference location, or datum, can be a pre-determined, pre-marked point, e.g., a "point-of-origin" in a surveying procedure.

The base 112 can optionally have a user interface 120, which can include a graphical user interface (GUI), such as an LED device, a display screen, indicator lights, digital readouts, a printer, etc. Input can also be provided at the user interface 120 via suitable switches, keys, etc. A rover 122 includes a rover receiver 124 connected to the base antenna 114 via an RF cable 125 and to a rover antenna 126 (Ar). The rover 122 can optionally include a graphical user interface (GUI) 128, as described above, a tripod 116 and a marking device 118. The receiver 124 can optionally be mounted on either the base 112 or the rover 122 and either or both of the base 112 and the rover 122 can include a suitable user interface 120 or 128, as described above. The base 112 location can be a specific, surveyed location if necessary for absolute positioning. If only relative accuracy is required, the absolute location of the base 112 is generally not required. The base antenna 114 is tethered to the rover receiver 124 by the RF cable 125, which can have a length of 100 meters or more as appropriate to accommodate surveying applications.

The system 110 is adapted for making localized surveys within the range of the RF cable 125. The GNSS ranging signals received by the two antennas 114 and 126 are processed by the same receiver 124 with a single clock, thereby avoiding the need for a second clock or clock synchronization associated with a second receiver. Signal delays associated with the RF cable 125 tend to be relatively constant due to its predetermined length and can be accommodated with a suitable offset value. Ambiguity resolution benefits from this arrangement because a clock offset, which would otherwise produce another unknown and increase the position solution complexity, is constant whereby the GNSS observations of the antennas 114, 126 can be more efficiently processed by the receiver 124 to provide a position solution (either relative or absolute) for the antennas 114, 126. Eliminating an unknown associated with a clock offset improves robustness and increases accuracy.

The effective range of the system 110 can be effectively increased by marking points 130 with the marking device 118 of the rover 122 near the end of its tethered travel, and then placing the base 112 on the marked points 130 and repeating the marking procedure with the rover 122 from the newly redefined base point. User interfaces 120, 128, which can include various I/O devices and displays, are adapted for uploading data files, such as computer aided drafting and design (CADD) files which can correspond to a surveyed project, such as a building or other structure. For example, a CADD file could be uploaded with a schematic of a building foundation. The user interface 128 could show the position of the rover 122 with respect to the schematic drawing. Key reference locations 130 of an outline 131 could then be marked at the base 112 and/or rover 122 locations, using ground stakes, paint or other suitable marking means applied with the marking devices 118. The rover 122 can include a programmable microprocessor 134 for computing position solutions (e.g., using ranging information from the receiver 124 and various correction techniques, which are well-known in the art), computing distances, computing areas, storing information, running routines, interacting with the user interfaces 120, 128, etc. The base user interface 120 can be eliminated whereby the base 112 includes only an antenna 114, a device for locating it on a particular point, such as a tripod 116, and/or a point marking device 118. In this configuration all of the user interface operations can occur via the rover 122. Alternatively, the base user interface 120 can be connected to the microprocessor 132 and used alternately with the base 112 and the rover 122 exchanging functions as the system 110 stakes out a perimeter or sequentially measures a relatively long distance (i.e. longer than the RF cable 125) comprising a chain-linked series of individual measurements.

Figure 7:
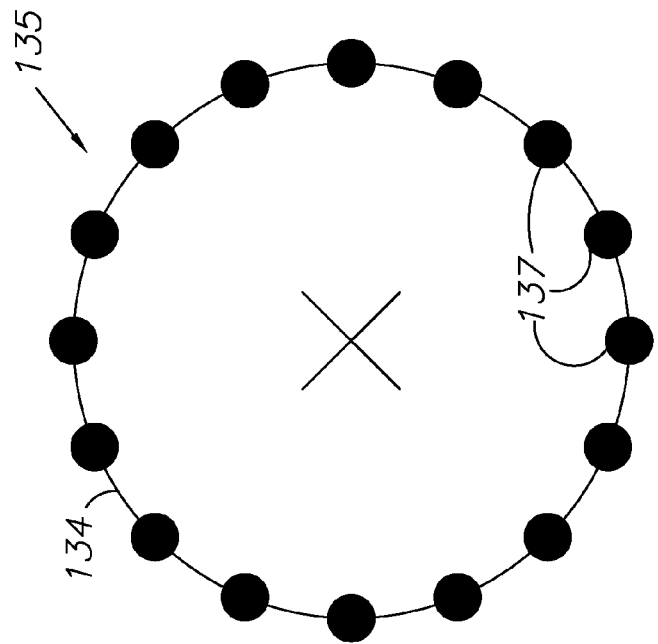
Figure 6:
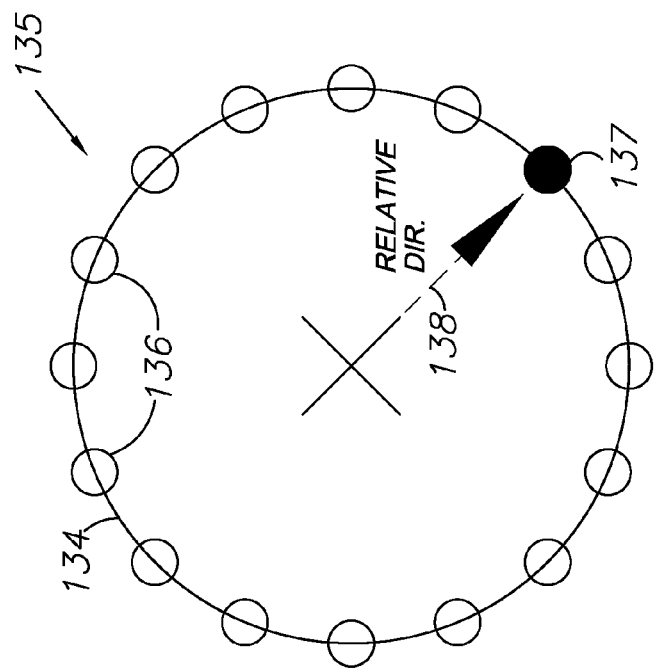
Figure 8B:
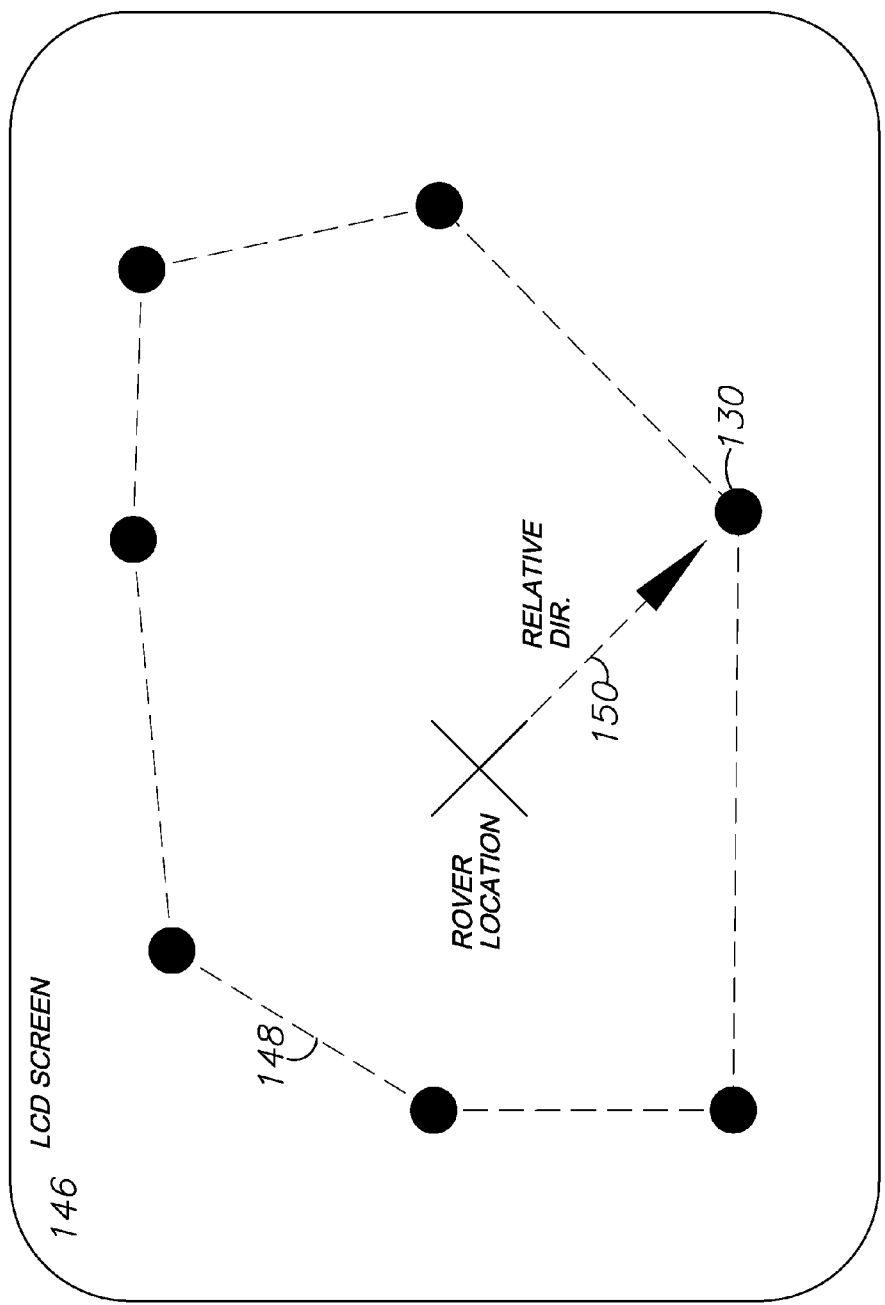

An example of a user interface 120, 128 is shown in FIGS. 6 and 7. The user interface 120, 128 includes a display 135 with the general configuration of a circular lightbar 134 with circumferentially-spaced lights 136 for positioning through 360°. As shown in FIG. 6, a light (e.g. LED, etc.) 137 is illuminated to indicate a relative direction via a directional arrow 138 for moving the rover 122. When the desired location is reached, the display 135 could change as shown in FIG. 7 whereby all lights 137 are illuminated. FIG. 8A shows a vector function of the system 110 whereby the base and rover 112, 122 are placed on marked points 130, the separation of which can be established by a fixed-length chain link 140 having a length "D." Such chains are commonly used in surveying. The antennas 114, 126 determine the GNSS-defined locations of the points 130, from which a baseline 142 (generally parallel with the chain link 140) is determined. A vector 144 is calculated in a direction perpendicular to the baseline 142 and generally represents the attitude of the system 110. Exemplary applications include laying out rect-angles and other polygons (e.g., the outline 131 shown in FIG. 5) with predetermined side dimensions and using the vector function to establish and/or verify the proper directional orientation. FIG. 8B shows an LCD screen 146 with an outline 148 (e.g., a building perimeter) displayed thereon. From a rover 122 location a GNSS-defined vector directional arrow 150 points towards a predetermined point location 130, to which the user is directed for placement of the rover 122, whereupon the located point 130 can be appropriately marked as described above.

Another exemplary application involves laying out the configuration of a foundation, an in-ground swimming pool or some other structure. The outline can be transferred as a .DXF (or some other suitable file format) file to the rover 122, which can comprise a handheld unit for maximum portability. The circular lightbar 134 (FIG. 6) can guide the user as described above to the point locations 130 defining intersections of walls or other points of interest around the structure. Still further, the lights 136 could comprise different colors for signifying the magnitude of directional error. For example, a range of colors corresponding to degrees of directional error could be used with green indicating a correct course. Local differential corrections can also be transmitted to the system 110, for example with conventional RTK techniques.

Figure 9:
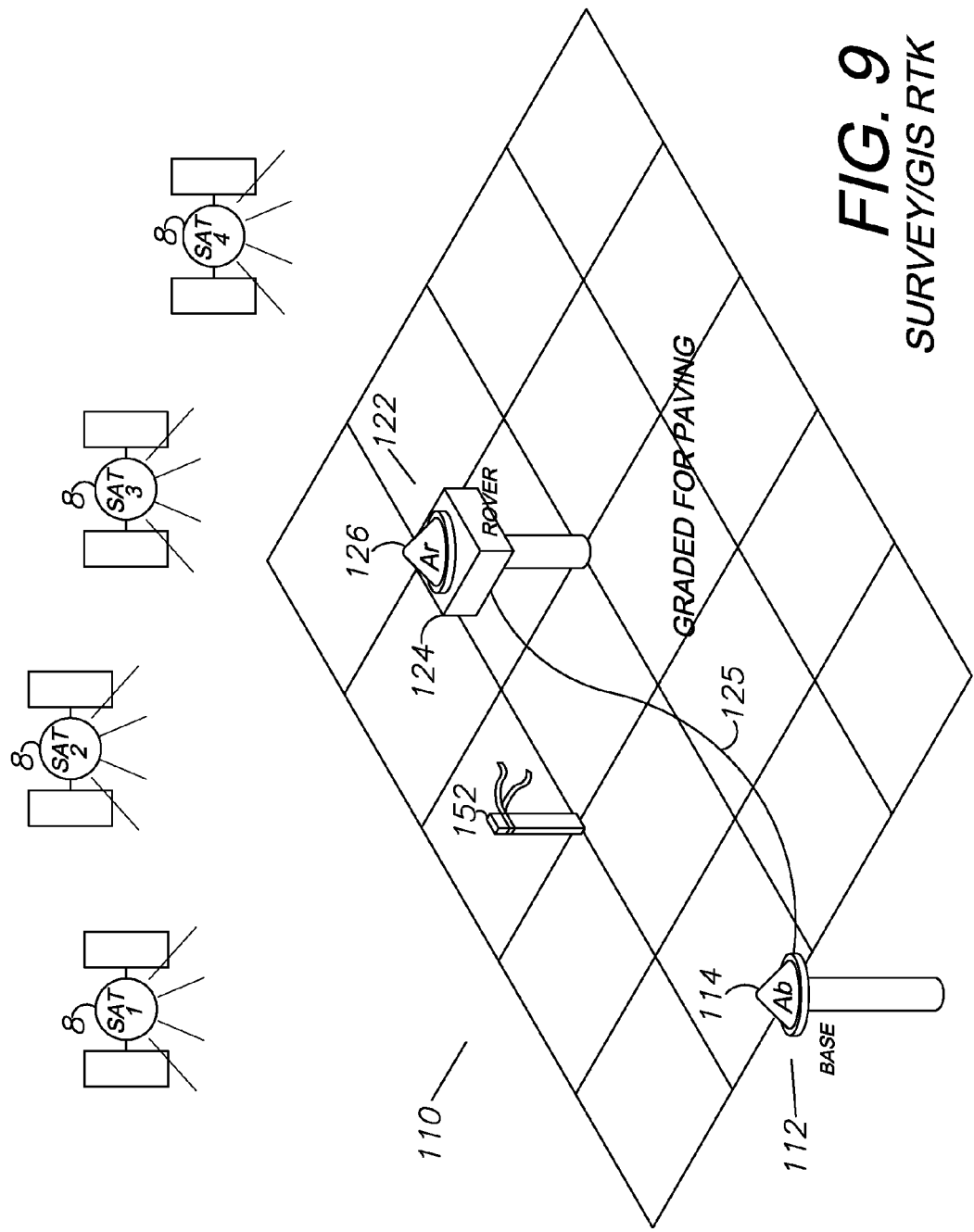
Figure 10:
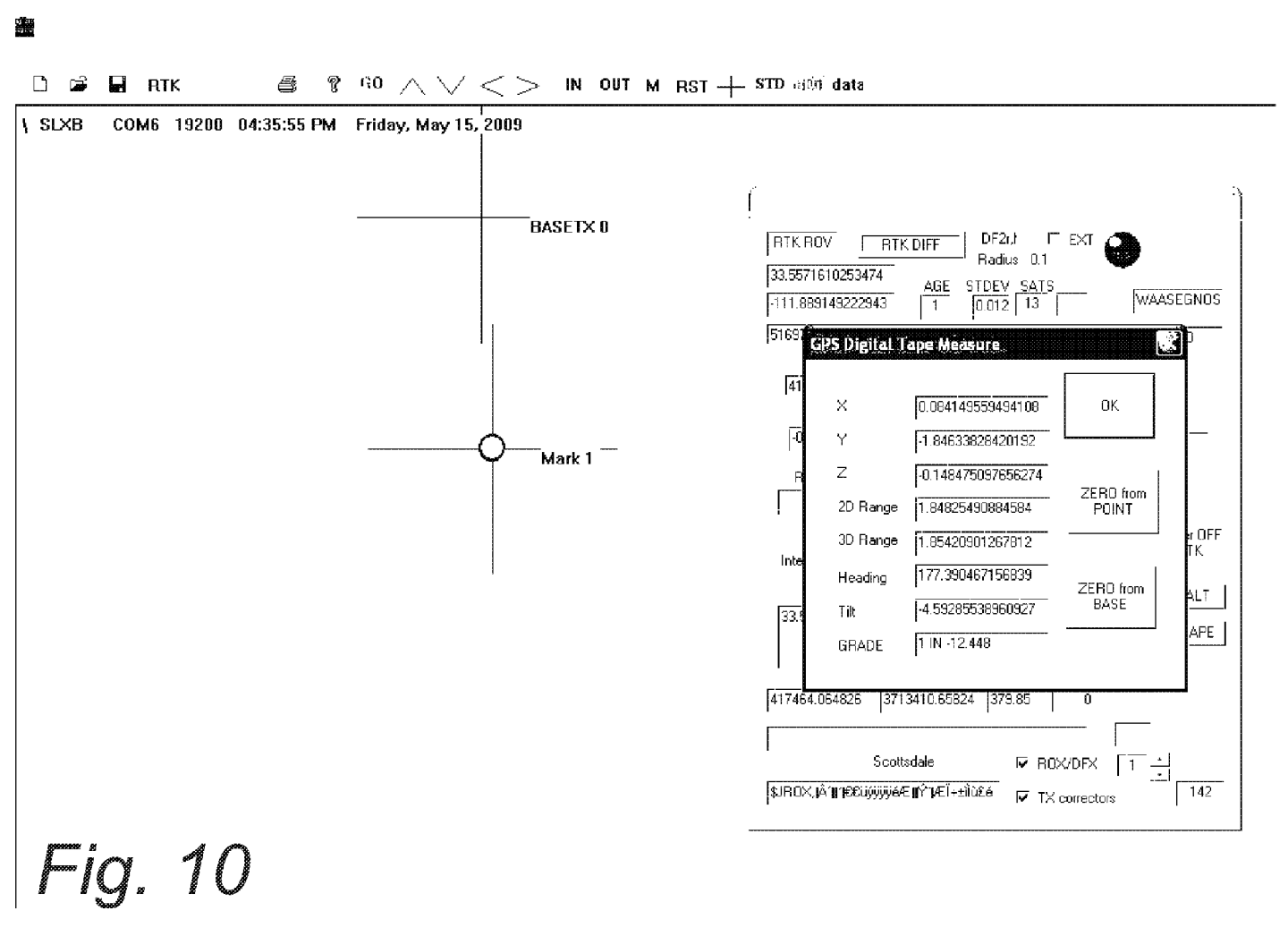

FIG. 9 shows an application of the positioning system 110 for establishing required heights for a structure, such as a flat slab, being constructed with poured concrete. An elevation stake 152 is shown at a location which can be determined with the rover 122, as described above. The application shown in FIG. 9 can utilize the 3-D positioning features of the system 110 for establishing elevations. For example, FIG. 10 shows a screen display for a computer running a "digital tape measure" application for locating multiple points with the system 110. GNSS-defined XYZ coordinates are available for all of the identified points, in addition to 2-D and 3-D distances between such points.

The locating system 110 is adaptable to a wide range of projects requiring precise point locations and attitude. For example, from a GNSS-defined centerpoint reference location, circles and arcs with constant radii can be defined. 3-D capabilities can be useful for structures requiring vertical slope, e.g. paved surfaces requiring positive slopes for drainage purposes. Sports fields and courts can also be expeditiously laid out and relocated. Still further, retractable and adjustable-length flexible members, such as surveying chains, can be utilized for fixed-length applications as described above. The software installed on the microprocessor 132 can create a digital 2-D or 3-D model of the outline or structure laid out using the system 110, with GNSS-defined positions corresponding to nodes or intersections of structural elements, such as walls. In a digital tape measure mode of operation, straight lines and other shapes can be measured off to any desired length, radius, or other parameter. Areas can be calculated from closed geometric shapes, such as polygons, circles, ellipses, etc. The captured and recorded data can be useful for creating as-built drawing files and recording material usages, such as yards of poured concrete. Surveying applications could include inputs comprising compass bearings with vertical slopes in expressed degrees or rise-over-run ratios. The I/O user interfaces 120, 128 can include "marking" functions activated by switches or simply placement of the base 112 or the rover 122. An audible signal can be provided for notifying the user of a "marked" location. Plotted outputs can include plans, elevation profiles, databases, etc.

The satellite systems as discussed herein may include but not be limited to Wide Area Augmentation System (WAAS), Global Navigation Satellite System (GNSS) including GPS, GLONASS and other satellite ranging technologies. The term WAAS is used herein as a generic reference to all GNSS augmentation systems which, to date, include three programs: WAAS (Wide Area Augmentation System) in the USA, EGNOS (European Geostationary Navigation Overlay System) in Europe and MSAS (Multifunctional Transport Satellite Space-based Augmentation System) in Japan. Each of these three systems, which are all compatible, consists of a ground network for observing the GPS constellation, and one or more geostationary satellites.

It will be appreciated that while a particular series of steps or procedures is described as part of the abovementioned process, no order of steps should necessarily be inferred from the order of presentation. For example, the process includes receiving one or more sets of satellite signals. It should be evident that the order of receiving the satellite signals is variable and could be reversed without impacting the methodology disclosed herein or the scope of the claims.

It should further be appreciated that while an exemplary partitioning functionality has been provided, it should be apparent to one skilled in the art, that the partitioning could be different. For example, the control of the master receiver 12 and the slave receiver 14 could be integrated with either receiver, or in another unit. The processes may, for ease of implementation, be integrated into a single unit. Such configuration variances should be considered equivalent and within the scope of the disclosure and claims herein.

The disclosed invention may be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or as data signal transmitted, whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the description has been made with reference to exemplary embodiments, it will be understood by those of ordinary skill in the pertinent art that various changes may be made and equivalents may be substituted for the elements thereof without departing from the scope of the disclosure. In addition, numerous modifications may be made to adapt the teachings of the disclosure to a particular object or situation without departing from the essential scope thereof. Therefore, it is intended that the Claims not be limited to the particular embodiments disclosed as the currently preferred best modes contemplated for carrying out the teachings herein, but that the Claims shall cover all embodiments falling within the true scope and spirit of the disclosure.

Having thus described the invention, what is claimed as new desired to be secured by Letters Patent is:

1. A method of locating GNSS-defined points and deriving distances, directional attitudes or closed geometric shapes from the locations of such points, which method comprises the steps of:
   providing a base with a base antenna;
   locating said base antenna in relation to a desired distance, attitude or shape;
   defining the location of said base antenna using GNSS;
   providing a rover with a rover receiver and a rover antenna connected to said receiver;
   connecting said base antenna to said rover receiver with an RF cable;
   locating additional points on said desired distance, attitude or shape with said rover antenna using GNSS;
   providing a microprocessor connected to said rover receiver and adapted for receiving as input GNSS-defined data from said rover receiver;
   calculating with said microprocessor a distance, attitude or shape using said GNSS-defined data;
   providing a graphical user interface (GUI) with a display;
   connecting said GUI to said rover receiver;
   transmitting code and carrier phase data from said base to said multiple-antenna rover;
   said processor determining the relative locations and relative ambiguities of the multiple rover antennas using an attitude solution that takes advantage of known constraints in geometry or clock;
   storing the rover-determined attitude solution locations and ambiguities;
   time-tag matching the data from the base;
   storing the current GNSS carrier phase observations; and
   improving positioning results by avoiding extrapolation errors by time tag matching base and rover data.

2. The method of claim 1, which includes the additional steps of:
   displaying a location on said display;
   displaying a directional arrow towards said location on said display; and
   orienting said directional arrow towards said location based on GNSS ranging data received by said base and rover antennas.

3. The method of claim 2, which includes the additional steps of:
   providing said display with a circular array of circumferentially-spaced indicator lights corresponding to respective user headings;

illuminating a respective indicator light corresponding to a heading from the user's present location towards said location; and illuminating all of said indicator lights on said user reaches said location.

4. The method of claim 3, which includes the additional steps of:

providing said GUI with a screen display;
displaying said rover location on said screen display;
displaying said directional arrow on said screen display;
marking a structure perimeter with multiple said locations; and
displaying said multiple locations defining said perimeter on said screen display.

5. The method of claim 1, which includes the additional steps of:

providing said rover with a support structure and a location marking device;
placing said support structure over said location; and
marking said location with said location marking device.

6. The method of claim 1, which includes the additional steps of:

transmitting code and carrier phase data from said base station to a multiple-antenna rover system;
said rover determining the relative locations and relative ambiguities of the multiple antennas using an attitude solution that takes advantage of known constraints in geometry or clock;
storing the rover-determined attitude solution locations and ambiguities;
time-tag matching the data from the base station;
storing the current GNSS observations (carrier phase); and
improving positioning results by avoiding extrapolation errors by time tag matching base and rover data.

7. The method according to claim 6, which includes the additional steps of calculating a carrier phase observation vector R of the rover as follows:

at antenna 1 of the rover: $R1=[A]x1-N1$, where R1 is a carrier phase observation vector (single or double difference) at antenna (1), A is a design matrix, X1 the location vector of antenna 1 (may include clock if single differencing is used), and N1 is an ambiguity vector for antenna 1;
at antenna 2: $R2=[A]x2-N2$ where R2 is a carrier phase observation vector at antenna 1, A is a design matrix, X2 is the location vector of antenna 2, and N2 is an ambiguity vector for antenna (2);
relative antenna displacement (V) $=x2-x1$;
relative ambiguity (M)$=N2-N1$;
$R1=[A]x1-N1$;
$R2=[A](x1+V)-(N1+M)$; and
$R=[A]x1-N$ where $R=[R1, R2-[A]V+M]^T$ and $N=[N1, N1]^T$ and 'T' denotes transpose.

8. The method claim 1, which includes the additional steps of:

locating said base at a first location;
locating said rover a predetermined distance from said base;
defining a baseline extending between said base and said rover;
calculating a vector extending perpendicularly from said baseline; and
locating said rover at a second location based on said predetermined distance and said vector.

9. The method of claim 8, which includes the additional steps of:

connecting said base and said rover by a fixed-length link corresponding to said predetermined distance.

10. The method of claim 9, which includes the additional step of:

marking the predetermined GNSS-defined locations of structure corners using one or more predetermined distances between said base and rover and multiple vectors for locating and marking said locations.

11. The method of claim 1, which includes the additional steps of:

locating predetermined grading elevations for a slab by forming a grid of predetermined locations;
associating a predetermined grading elevation with each said predetermined grid location;
placing elevation stakes at each said grid location; and
associating a respective design grading elevation with each said elevation stake.

12. The method of claim 1, which includes the additional steps of:

calculating the distance between first and second locations using GNSS-defined positions of said base and rover units;
calculating the distance between second and third locations using GNSS-defined positions of said base and rover units; and
calculating the distance between said first and third locations by using the distances between said first and second and said second and third locations respectively.

13. A method of locating and marking a plurality of predetermined, GNSS-defined locations defining a perimeter of a structure, which method comprises the steps of:

providing a base with a base antenna;
placing said base in proximity to a position of said structure;
providing a rover with a rover receiver and multiple rover antennas connected to said receiver;
providing a processor connected to said rover receiver and adapted for receiving as input GNSS-defined data from said rover receiver;
connecting said base antenna to said rover receiver with an RF cable;
defining the location of said base antenna using GNSS signals received by said base antenna;
locating points along said structure perimeter with said rover antenna using GNSS signals;
calculating with said processor a distance, attitude or shape using said GNSS-defined data;
providing a graphical user interface (GUI) with a display;
connecting said GUI to said processor;
displaying a target location on said display;
displaying a directional arrow towards said target location on said display;
orientating said directional arrow towards said target location based on GNSS ranging data received by said base and rover antennas;
providing said GUI with a screen display;
displaying said rover location on said screen display;
displaying said directional arrow on said screen display;
marking a structure perimeter with multiple said locations;
displaying said multiple locations defining said perimeter on said screen display;
providing said rover with a support structure and a location marking device;
placing said support structure over said locations;
marking said locations with said location marking device;
locating said base at a first location;

locating said rover a predetermined distance from said base;
defining a baseline extending between said base and said rover;
calculating a vector extending perpendicularly from said baseline;
locating said rover at a second location based on said predetermined distance and said vector;
transmitting code and carrier phase data from said base to said multiple-antenna rover;
said processor determining the relative locations and relative ambiguities of the multiple rover antennas using an attitude solution that takes advantage of known constraints in geometry or clock;
storing the rover-determined attitude solution locations and ambiguities;
time-tag matching the data from the base;
storing the current GNSS carrier phase observations; and
improving positioning results by avoiding extrapolation errors by time tag matching base and rover data.

14. A system for locating GNSS-defined points and deriving distances, directional attitudes or geometric shapes from the locations of such points, which system includes:
a base with a base antenna located in relation to a desired distance, attitude or shape;
a rover with a rover receiver and a rover antenna connected to said receiver;
said base antenna being connected to said rover receiver with an RF cable;
a processor connected to said rover receiver and adapted for receiving as input GNSS-defined data from said rover receiver;
said processor being adapted to calculate a distance, attitude or shape using said GNSS-defined data;
a graphical user interface (GUI) with a screen display connected to said rover receiver;
a transmitter for transmitting code and carrier phase data from said base to said multiple-antenna rover;
said processor being adapted for determining the relative locations and relative ambiguities of the multiple rover antennas using an attitude solution that takes advantage of known constraints in geometry or clock;
a storage device connected to said processor and adapted for storing the rover-determined attitude solution locations and ambiguities;
said processor being adapted for time-tag matching the data from the base;
said processor being adapted for storing the current GNSS carrier phase observations; and
said processor being adapted for improving positioning results by avoiding extrapolation errors by time tag matching base and rover data.

15. The system according to claim 14, which includes:
said GUI being adapted for displaying a directional arrow towards said location on said display; and
said directional arrow being directed towards said location based on GNSS ranging data received by said base and rover antennas.

16. The system of claim 15, which includes:
said display including a circular array of circumferentially-spaced indicator lights corresponding to respective user headings;
said processor being adapted for illuminating a respective indicator light corresponding to a heading from the user's present location towards said location; and
said processor being adapted for illuminating all of said indicator lights when said user is at said location.

17. The system of claim 14, which includes:
said rover including a support structure and a location marking device connected to said support structure and adapted for placement over said location and marking said location.

18. The system of claim 14, which includes:
said processor being adapted for defining a baseline extending between said base and said rover;
said processor being adapted for calculating a vector extending perpendicularly from said baseline; and
said processor being adapted for locating said rover at a location based on said predetermined distance and said vector.

19. The system of claim 14, which includes:
said rover having multiple antennas;
said base station being adapted for transmitting code and carrier phase data to said rover;
said processor being adapted for determining the relative locations and relative ambiguities of the multiple rover antennas using an attitude solution that takes advantage of known constraints in geometry or clock;
said processor being adapted for storing the rover-determined attitude solution locations and ambiguities;
said processor being adapted for time-tag matching the data from the base station;
said processor being adapted for storing the current GNSS observations, carrier phase, and
said processor being adapted for time tag matching base and rover data and thereby improving positioning results by avoiding extrapolation errors.

20. The system of claim 14, which includes:
said processor being adapted for calculating the distance between first and second locations using GNSS-defined positions of said base and rover;
said processor being adapted for calculating the distance between second and third locations using GNSS-defined positions of said base and rover; and
said processor being adapted for calculating the distance between said first and third locations by using the distances between said first and second and said second and third locations respectively.

21. A system for measuring distances using GNSS-defined points, which system includes:
a base with a base antenna located in relation to a desired distance, attitude or shape;
a rover with a rover receiver and multiple rover antennas connected to said receiver;
said base station being adapted for transmitting code and carrier phase data to said rover;
said base antenna being connected to said rover receiver with an RF cable;
a processor connected to said rover receiver and adapted for receiving as input GNSS-defined data from said rover receiver;
said processor being adapted to calculate a distance, attitude or shape using said GNSS-defined data;
said processor being adapted for calculating the distance between first and second locations using GNSS-defined positions of said base and rover;
said processor being adapted for calculating the distance between second and third locations using GNSS-defined positions of said base and rover;
said processor being adapted for calculating the distance between said first and second locations by using the distances between said first and second and said second and third locations respectively;

said processor being adapted for determining the relative locations and relative ambiguities of the multiple rover antennas using an attitude solution that takes advantage of known constraints in geometry or clock;

said processor being adapted for storing the rover-determined attitude solution locations and ambiguities;

said processor being adapted for time-tag matching the data from the base station;

said processor being adapted for storing the current GNSS observations, carrier phase, and said processor being adapted for time tag matching base and rover data and thereby improving positioning results by avoiding extrapolation errors.

\* \* \* \* \*